United States Patent [19]
Anderson

[11] Patent Number: 4,507,592
[45] Date of Patent: Mar. 26, 1985

[54] MICROPROCESSOR CONTROLLED TAPE CAPSTAN

[75] Inventor: Robert L. Anderson, Boulder, Colo.

[73] Assignee: Storage Technology Corporation, Louisville, Colo.

[21] Appl. No.: 601,809

[22] Filed: Apr. 19, 1984

Related U.S. Application Data

[63] Continuation of Ser. No. 459,720, Jan. 21, 1983, abandoned, which is a continuation of Ser. No. 321,070, Nov. 13, 1981, abandoned.

[51] Int. Cl.³ .............................................. H02P 1/22
[52] U.S. Cl. .................................. 318/268; 318/270; 318/618
[58] Field of Search .................. 318/3, 6, 7, 398, 369, 318/270, 271, 463, 464, 618, 268; 364/550, 570, 579; 360/73, 74.1; 242/46

[56] References Cited
U.S. PATENT DOCUMENTS

| 3,706,020 | 12/1972 | Klang | 318/270 |
| 3,836,833 | 9/1974 | Harris et al. | 318/270 |
| 3,904,943 | 9/1975 | Klang | 318/395 |
| 3,969,663 | 7/1976 | Arthur et al. | 318/561 |
| 4,302,785 | 11/1981 | Mussatt | 360/72.1 |
| 4,321,517 | 3/1982 | Touchton et al. | 318/618 |

Primary Examiner—Ulysses Weldon
Attorney, Agent, or Firm—Woodcock, Washburn, Kurtz, Mackiewicz & Norris

[57] ABSTRACT

An improved magnetic tape drive having high performance specifications is achieved by microprocessor control of the capstan motion. Possible velocity profiles are stored in read-only memory and are selected on the basis of new input commands and last previous actions taken, whereby excitation of mechanical resonance inherent in the system is avoided.

8 Claims, 8 Drawing Figures

MICROPROCESSOR CONTROLLED TAPE CAPSTAN

This is a continuation, of application Ser. No. 459,720, filed Jan. 21, 1983, now abandoned, which is a continuation of application Ser. No. 321,070, filed Nov. 13, 1981 now abandoned.

FIELD OF THE INVENTION

This invention relates to control of the capstan used to drive magnetic tape for the storage of data. More particularly, the invention relates to improved methods of control of the rotational motion of such capstans, whereby high rates of acceleration to a target tape speed can be achieved without excitation of torsional vibration.

BACKGROUND OF THE INVENTION

The American National Standards Institute (ANSI) has defined certain standards for the performance of magnetic data storage tape drive apparatus. In particular, data to be recorded according to ANSI standards is recorded in blocks separated from one another by no less than 0.280 inches. This interblock gap is therefore that space in which a tape drive starting in the interblock gap must accelerate to its full design speed. Various tape velocities are standard, including up to 200 inches per second (ips). The goal of providing a tape drive which can accelerate to 125 ips within the 0.075 inch start distance (which is an acceleration of some 500 times the acceleration of gravity or 500 g's) is a requirement of a commercial tape drive.

The art has traditionally separated the mass of the tape carried on supply and take up reels from that portion of the tape in the vicinity of the read/write head (which is that portion of the tape which in fact must be accelerated to satisfy the requirements mentioned above) by decoupling that portion from the bulk of the tape, using vacuum columns in which loops of tape are carried. In this way, only the relatively small portion of the total tape in the vicinity of the head need be accelerated at very high rates, whereas the bulk of the tape carried on the reels can be accelerated relatively slowly. However, high acceleration of the portion of the tape in the vicinity of the heads is a significant engineering problem. To this end a vacuum capstan is typically used. Such a capstan is a hollow, cylindrical wheel having many holes in its periphery in contact with the tape. A vacuum is applied to the center of the hollow capstan so as to suck the tape into firm, non-sliding contact with the capstan. The capstan is made very light and of low inertia, so that it can be very quickly accelerated to speed, whereby the tape in contact with the capstan quickly reaches the design speed of the tape drive. See, for example, U.S. Pat. No. 4,065,044 to Painter et al for an example of such capstans.

The control of the acceleration of a capstan, even a relatively lightweight, low inertia one such as that disclosed in the Painter et al patent, remains a difficult problem. To this extent, numerous motion control schemes have been devised. According to the present invention, a microprocessor is used to continuously sample the actual speed of the tape drive and accelerate, decelerate or hold it at a steady angular velocity, as indicated by comparison of the actual velocity signal with a velocity command signal. The use of the microprocessor allows considerable versatility of the system to adapt to conditions encountered and allows long-term stability without regard to variations in, e.g., component tolerance and the like.

OBJECTS OF THE INVENTION

It is therefore an object of the invention to provide an improved drive for a magnetic tape system.

A further object of the invention is to provide a magnetic tape drive system in which a microprocessor controls the motion of a vacuum capstan used to move that portion of the tape juxtaposed to the head at any given time.

Still a further object of the invention is to achieve extremely high rates of acceleration of a tape to a steady, carefully controlled running speed without undue fluctuations in tape speed due to mechanical resonances in the device or to "hunting" of an analog servo loop.

SUMMARY OF THE INVENTION

The above needs of the art and objects of the invention are satisfied by the present invention in which a microprocessor utilizing look up tables for velocity profiles is used to control the motion of the tape capstan. The microprocessor examines each incoming command to determine whether it is likely to excite a vibration and, if so, modifies the capstan control so as to avoid the vibration.

BRIEF DESCRIPTION OF THE DRAWINGS

The invention will be better understood if reference is made to the accompanying drawings, in which.

DESCRIPTION OF THE PREFERRED EMBODIMENTS

As discussed above, the invention relates to control of the vacuum capstan used in a magnetic tape drive, in particular one for storage of data. Copending application Ser. No. 123,729, filed Feb. 22, 1980, in the name of Epina et al incorporated herein by reference shows a tape drive in detail in which the capstan and control circuitry of the invention has application. In particular, that copending application describes a tape drive which is capable of achieving 200 ips performance while remaining within the ANSI standards with respect to interblock gap as described above. The invention of that application involves the particular tape path along which the magnetic tape passes between the take-up and supply reels. The present invention relates to the capstan which is used to accelerate the tape up to speed upon, for example, a host computer command, and is accordingly not limited to the particular tape path shown in the copending application referred to above, but instead has applicability to many other forms of tape transport systems.

Figure 1:
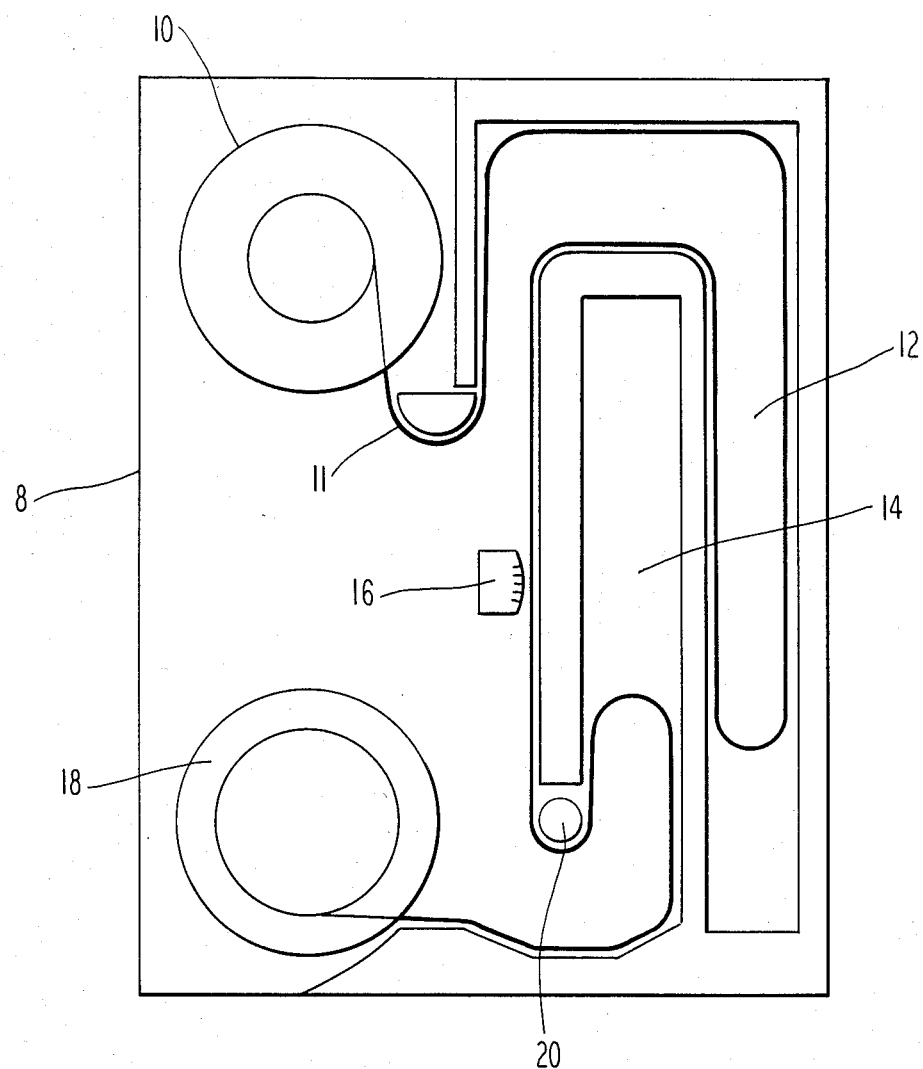
FIG. 1 shows an schematic elevation view of the face plate of a tape drive using the capstan control system of the invention.

FIG. 1 shows a schematic layout of a tape drive. For example, a vertically extending face plate 8 carries a supply reel 10 from which tape 11 is supplied. The tape passes through a first vacuum column 12, past a read/write head 16, into and out of a second vacuum column 14, and is taken up upon the tape-up reel 18. The tape 11 is passed through the vacuum columns 12 and 14 so that the mass of tape carried on the reels 10 and 18 is decoupled from that in the vicinity of the read/write head 16. Thus, when it is desired that a stopped tape be accelerated to its design speed or stopped from that design speed, a capstan 20 can accelerate the relatively small portion of the tape 11 juxtaposed to the read/write head 16 while the columns allow this part of the total mass of tape to move at a different rate than that carried on the reels 10 and 18. When the reels come up to speed, the loops of tape within the vacuum columns 12 and 14 regain their original sizes, these having varied during the start operation, as is well understood in the art.

Figure 2:
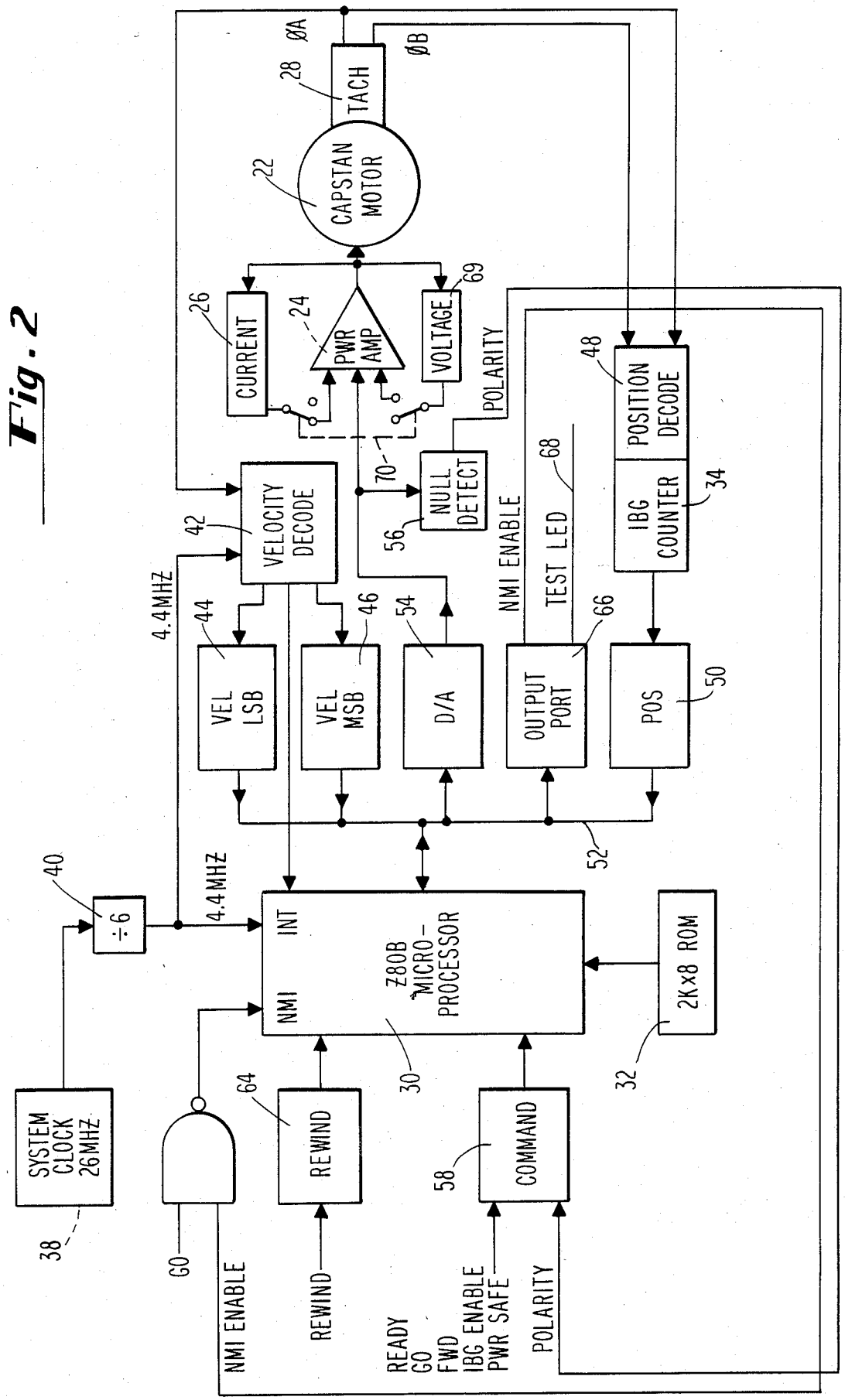
FIG. 2 shows a schematic diagram of the layout of the capstan control system.

As noted, the present invention relates to microprocessor control of the motor driving the capstan. A schematic overview of the system used is shown in FIG. 2. The capstan motor 22, which drives the capstan 20 (FIG. 1) operates under the control of a power amplifier 24 which has both current 26 and voltage 69 feedback. Mounted on the motor shaft is a tachometer 28 providing two phase output signals $\phi A$ and $\phi B$. The tachometer 28 is a 1000 line two-phase incremental encoder whose full period is 45.2 microseconds at running speed. It is these output signals which provide the computational workload for the system, which is based on a microprocessor 30 supplied with its operating program, and certain look-up tables discussed in detail below, by a 2K by 8-byte ROM 32. As noted, at 125 ips the tachometer period is 45.2 microseconds. To get $\frac{1}{2}\%$ period measurement resolution requires a count rate of 4.4 mHz. This is supplied by a system clock 38 operating at 26 mHz, the output of which is divided by 6 in a divide-by-6 network 40, the output of which is supplied to a transistor-transistor-logic (TTL) counter 42, operating as a velocity decoder. The output of the decoder 42 is stored in registers 44 and 46 which feed the microprocessor bus, thus providing a signal of the instantaneous velocity once every tach period.

Direction detection and position counting are also implemented in logic outboard of the processor in order to minimize computation delay. FIG. 2 shows the two phase outputs of the tachometer 28, $\phi A$ and $\phi B$, being supplied to a position decode network 48 which feeds an interblock counter 34 so as to keep an accurate register of the position of the tape in a non-running situation. The position output is supplied to the microprocessor via a position register 50, connected to the microprocessor bus 52. The output of the microprocessor 30 is supplied to a digital-to-analog (D/A) converter 54, supplying the analog signal which controls the power amplifier 24 which drives the capstan motor 22. The output of the D/A converter 54 is also supplied to a null detect network which supplies a D/A zero-adjust signal, including a polarity signal supplied to a command register 58, in which are also stored operator or host initiated commands supplied to the microprocessor 30.

Thus, the microprocessor 30 is provided with digital velocity and position signals so that it requires very few program steps to determine the next current command to be supplied to the D/A converter 54 and thence to the power amp 24 to control the further motions of the motor 22. In a preferred embodiment, a Zilog Z80B microprocessor was chosen because it has enough speed to complete the required program steps safely within less than 1 tachometer period. Its internal registers are sufficient to implement the design without use of external RAM which satisfies the goal of the invention of simplicity. A single 2K by 8-byte ROM 32 is used to store both the program instructions and certain look-up tables discussed in detail below. The rewind command is supplied to the Z80B through a rewind command register 64. Also supplied as an output of the Z80B is a "NMI enable" signal, which is stored in an output port register 66 and gates the NMI input of the Z80B. It is combined with the GO signal in an inverted-output AND gate to generate the NMI input. A test LED appearing on the card is lit as indicated at 68 as an aid in diagnostics.

As discussed above, the capstan control arrangement of the invention was originally designed to be incorporated within the pre-existing drive which is the subject matter of copending application Ser. No. 123,729, filed Feb. 22, 1980. That particular drive, as do all drives, has certain mechanical components and tape path geometries which have resonant frequencies which can be excited by motor current profiles and program commands executed at the appropriate frequencies. For example, the motor used to drive the capstan has a torsional resonance at 4500 Hz, the vacuum columns have resonant frequencies of 35 and 55 Hz, and the tape stretched between the capstan and vacuum column has a resonance frequency between 1.2 and 1.6 KHz. Clearly it is desirable to control the capstan motor in such a way that all these resonances and the attendant physical instabilities are eliminated. Careful control by the microprocessor of the capstan motor, as will be discussed in detail below, allows all these resonances to be avoided, and smooth operation achieved. Similarly, the other objects of the invention, achieving 1 millisecond starts, that is, within the 0.075 inch start distance and settling within ANSI standards for velocity within about 1.2 milliseconds, are achieved with this design. Microprocessor use also permits better velocity control and simpler design, yielding a lower chip count and reduced hardware costs.

Figure 3:
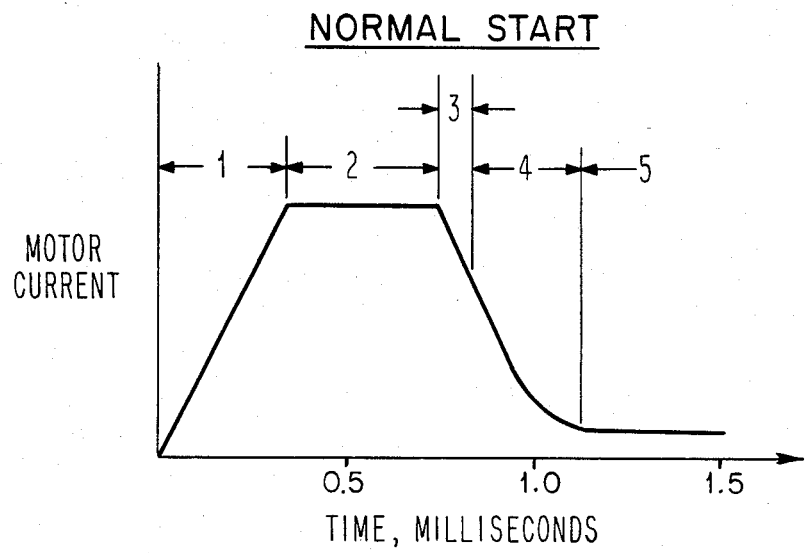
FIG. 3 shows a graph of motor current versus time in a normal start operation.
Figure 4:
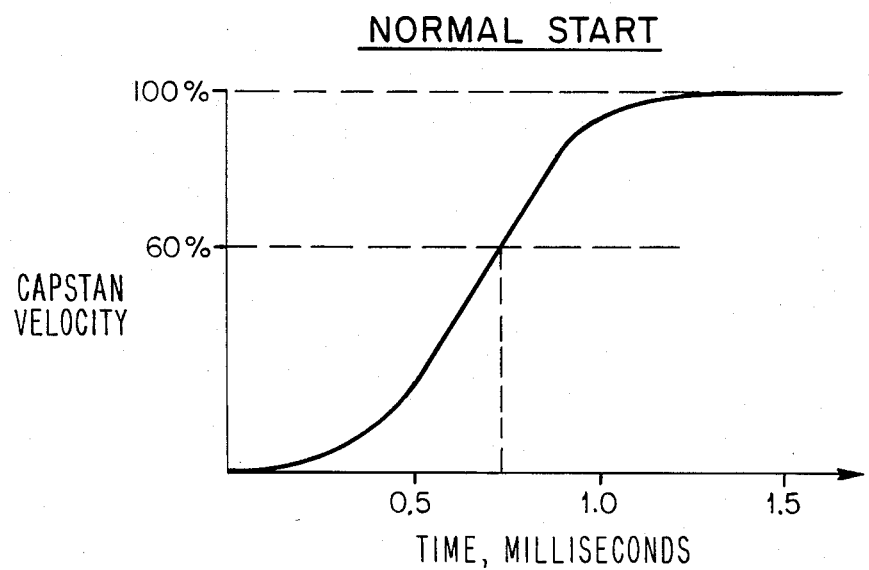
FIG. 4 shows velocity versus time for the start operation.
Figure 5:
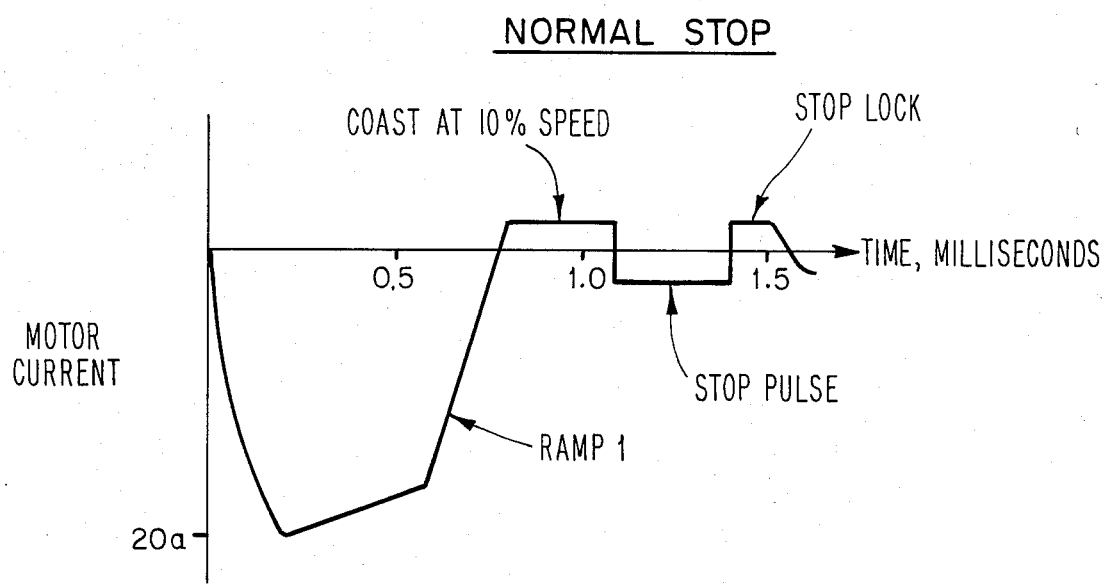
FIG. 5 shows current versus time for a normal stop operation.
Figure 6:
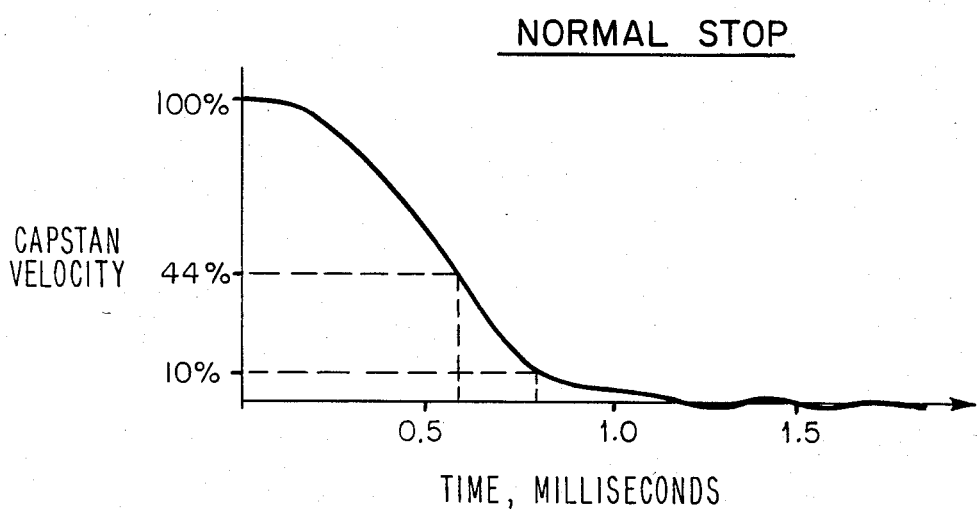
FIG. 6 shows velocity versus time for a normal stop operation.
Figure 7:
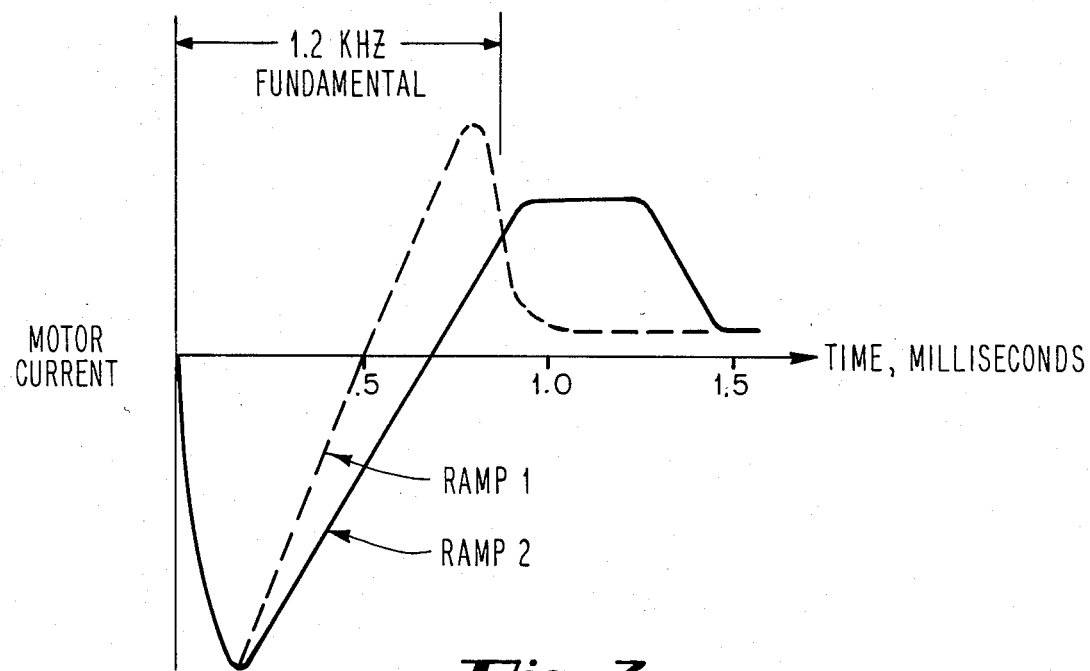
FIG. 7 shows the motor current versus time for two possible courses of action taken in a worst case short stop situation.

FIGS. 3 through 8 show current and velocity profiles for several of the more usual operations undergone by the system according to the invention. FIGS. 3 and 4 show current and velocity profiles, respectively, for a normal start; FIGS. 5 and 6 show current and velocity profiles for a normal stop; and FIGS. 7 and 8 current velocity profiles, respectively, for the worst case short stop situation in which the 1.2 KHz resonance mentioned above can be encountered if the appropriate steps are not taken.

FIG. 3 shows motor current during a conventional start operation from zero velocity and FIG. 4 shows the accompanying velocity profile. The current supplied is, as noted, divided into five phases. During phase 1, current is increased at a constant rate to a limit which is maintained during phase 2. The programmed current build up in phase 1 reduces the excitation of the motor's torsional resonance at 4500 Hz. Transition from phase 2 to phase 3, in which reduction of current begins, occurs at approximately 60% of full speed. However, capstan speed is changing too fast, approximately a 15% change occurring per tach period, to accurately determine when 60% of full speed occurs. The solution chosen was to watch the tach period during phase 2 and, knowing that acceleration is proportional to current, compute the time remains until 60% of full speed is reached. When that time is reached, the timed ramp-down of phase 3 is initiated without having to wait for another whole tach period to be consumed. In a preferred embodiment, the computation of time remaining is actually done by table look-up. In phase 4, the velocity is high enough to use simple proportional control with current proportional to velocity error. That is to say, full design velocity would be compared with that in the two actual velocity registers 44 and 46. In this operation, the use of the microprocessor 30 provides another important advantage. Speed in this phase is still changing by as much as 10% per tach period making measured speed lag actual speed at sampling times. This effect is eliminated by using another look up table stored in ROM 32 to contain the current values modified by the known sampling lag.

Integral action is added to proportional action during phase 5 when the capstan is at nearly full speed. Two integrators are used, both implemented by registers within the processor 30. The first integrator starts with zero initial condition at the beginning of phase 5 and responds fast enough to correct for the varying tape tension load imposed by the two vacuum columns 12 and 14 (in FIG. 1) whose resonant frequencies are 35 to 55 Hz. Whenever the "GO" command to the tape drive is dropped and the motor stops, the contents of the first integrator register are used to increment the second by a fixed amount. The second integrator has a slower response time than the first, but is not reset when "GO" is dropped. It is, therefore, capable of compensating for variations in drag, torque constant and analog circuit offsets. The switching and memory capabilities of the microprocessor 30 thus make the advantages of error integration possible, without the usual overshoot problems that one would expect with an analog integrator.

It will be observed by those skilled in the art that there is a relatively smooth transition between phases 4 and 5. This is done in order to eliminate the errors caused by shaft wind up between the motor and the tachometer disk as suggested in the prior art, for example, see U.S. Pat. No. 3,904,943 to Klang.

FIGS. 5 and 6 show, respectively, motor current and velocity versus time for a normal stop operation. When the "GO" command to the drive drops, the microprocessor initiates the "STOP" routine. The power amplifier which is in the current mode for the "START" and "RUN" operations is switched 70 to voltage mode 69 for "STOP". As will be observed, the motor stop current is increased to approximately 20 amps in the case of a particular motor chosen, which draws a like figure, typically 24 amps at 30 volts for a one millisecond start operation as described above. The current is gradually decreased during the "STOP" operation in the area marked Ramp 1, in a preferred embodiment beginning when the motor velocity is expected to have dropped to 44% of full speed. The higher initial current is used to insure that position overshoot is avoided. This wave shape minimizes shaft windup towards the end of a "STOP" operation when another "GO" command may occur. This situation will be discussed below in connection with FIGS. 7 and 8. "Ramp 1" is continued until the motor has slowed to approximately 10% of full speed, as shown. This speed is maintained by a small positive current until the desired stop position, in the preferred embodiment 0.075 inches, is approached. At this point a stop pulse reduces the speed of the capstan to nearly zero. Thereafter, the "STOP LOCK" phase is entered. It will be appreciated that the two-phase tachometer described above measures position error with a resolution of 0.0014 inches. Use of the "STOP LOCK" algorithm resulting in the "STOP LOCK" current shape shown in FIG. 5 avoids the need for lead lag compensation as practiced by the prior art, by applying motor current correction for only a short pulse followed by dynamic braking until the next tach transition is sensed.

As was discussed above, the low rate of change of current in START is very effective in avoiding excitation of the 4.5 KHz torsional resonance of the motor/capstan combination. In the particular tape drive design shown in the copending application referred to and incorporated by reference above, another broader, less peaked resonance exists between 1.2 and 1.6 KHz, attributable to the stretch between capstan and vacuum column. This resonance can be excited, for example, if the "GO" signal is dropped for approximately 200 microseconds, causing "STOP" to begin, and "GO" is then reapplied. Without detection of and compensation for this sequence, the capstan control will respond with the usual Ramp 1 current increase upon "STOP", and will continue it into the positive current region as shown in the dashed line of FIG. 7. Since the resultant current profile required to return to full speed has a shape which has almost all its energy at 1.2 KHz, resonance would occur. However, up to 300 microseconds into the stop routine, the motor speed is still above 50% and can be recovered to 100% within the alloted time while using a slower rate of change of current and a reduced start current limit (for example, 14 amps instead of 24) resulting in the shape shown as Ramp 2. Accordingly, the microprocessor is programmed to detect the possibility of excitation of this resonance, and applies Ramp 2 when it does so.

Figure 8:
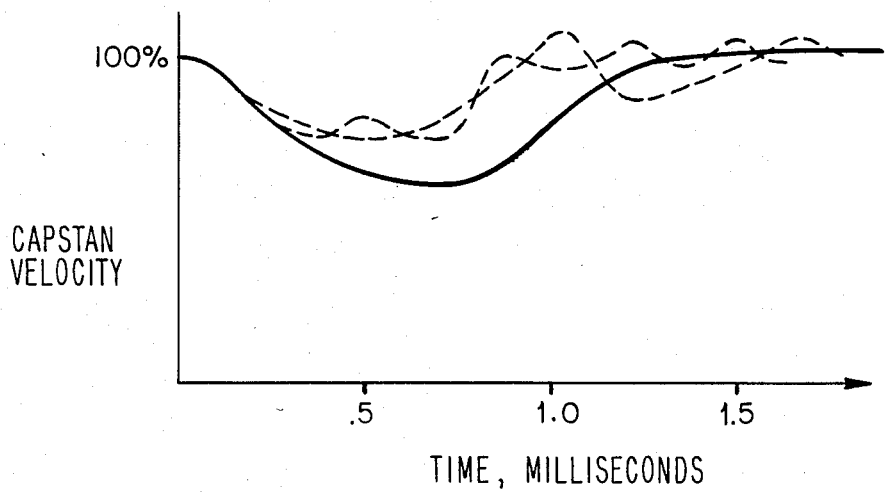
FIG. 8 shows velocity versus time for the several possibilities of the worst case short stop operation.

FIG. 8 shows velocity as a function of time for the several possibilities shown. The solid line indicates the current profile which is followed when it is detected by the microprocessor that the possibility of excitation of the 1.2 KHz resonance exists and Ramp 2 is used instead. The several dotted lines are possible velocity profiles which can occur if Ramp 2 is not followed that is, if Ramp 1 is used. Those skilled in the art will recognize the problems inherent in the velocity fluctuations shown.

In the case when "GO" comes back up after 300 microseconds into the "STOP" operation and before Ramp 1 is completed, the speed has been reduced so that Ramp 2 can no longer be used. The microprocessor therefore simply delays responding to such commands until Ramp 1 has reached the near zero current value. This avoids putting too much energy into the system near the resonant frequency and makes up for any theoretical increase in access time by reducing settling time, i.e., the time required for the tape velocity to settle within the ANSI standards.

It will be appreciated that there has been described a microprocessor system which allows extremely low access times, that is, very fast start or stop operations, while simultaneously meeting ANSI velocity standards. Torsional vibrations are substantially reduced by adaptively adjusting the motor current profile to avoid possible resonances, while use of the look-up tables in ROM to determine the particular current profile to be used at any given time allows versatility in the tape drive of the invention. In particular, it can easily be converted from 125 to 75 or 50 ips. The control circuitry is substantially simplified over that which had previously been used; further reductions would be made possible by large-scale integration. Use of the microprocessor also allows several automatic calibration routines and diagnostic aides, e.g. the test LED indication, and the automatic nulling of the D/A converter, to be built in to the extent that no manual adjustments are required in the commercial embodiment of the capstan servo control system of the invention.

Attached hereto is a document marked appendix A entitled, "Capstan Digital Servo System". This document will be recognized by those skilled in the art as a complete microcode version of the control programming of the capstan servo control of the invention. Those skilled in the art provided with this document and the above disclosure, including the control system schematic diagram of FIG. 2 would have no difficulty in implementing the invention.

It will be appreciated that there are additional modifications and improvements which can be made to the invention without departing from its essential spirit and scope which should therefore not be limited by the above disclosure, but only by the following claims.

APPENDIX A

```
CAP125            12-JUN-81        Version A02                        PAGE   1

TITLE 'CAP125             12-JUN-81        Version A02
   LIST X,A                                                           STC-153

****************************************************
         *                                                  *
         *                                                  *
         *           CAPSTAN DIGITAL SERVOSYSTEM            *
         *                                                  *
         *                SPEED:  125 IPS                   *
         *                                                  *
         *                                                  *
         ****************************************************

***********
         *   *  U P D A T E S  *  *
         ***********
         15-jun     ..increase backward starting current at GOINT6
         A02        ..test HP bit for stopping current
         ***********
         25-feb     ..adjusted stop current's (because of bastard JP in 1950
         A00        ..double sample of position in STOPLOCK
                    ..integrator's reset in servo
                    ..installed STOPLCK routine from CAP75 PROGRAM
         ***********
         13-JAN-81  ..repaired EXX's in stoplock
         3.9
         ***********
         5-JAN-81   changed most JP's to JR to claim more room
         3.8        removed HIGAIN code in stoplock
                    re-arranged IDLE and NULLSET
                    corrected VELOCITY x-fer to sequencer
         ***********

GO         START CAPSTAN MOTION  (NMI INTERRUPT)
                    1)  START ROUTINES; NORMAL OR SHORT GO-DOWN
                    2)  RAMP CURRENT TO 20 AMP IN 200 USEC; HOLD TO 65 IPS
                    3)  RAMP DOWN TO 13 AMPS AND SWITCH TO LOOK-UP TABLES
                    4)  RUN ROUTINE USES INTEGRATOR TO MAINTAIN VELOCITY
```

LINE  ADDR  B1 B2 B3 B4

1
2
3    0000
4    0000
5    0000
6    0000
7    0000
8    0000
9
10
11
12
13
14
15
16
17
18
19
20
21
22
23
24
25
26
27
28
29
30
31
32
33
34
35
36
37
38
39
40
41
42
43
44
45   0000
46   0000
47   0000
48
49
50
51
52

```
                 5) MOTOR UPDATES ARE SYNCHRONOUS WITH TACH LINES
53  ;
54  ;    STOP     STOP MOTION AND MAINTAIN STOP LOCK POSITION
55  ;                 1) VELOCITY PROGRAMMED DECELERATION TO 12 IPS
56  ;                 2) RUN AT 12 IPS TO IBG COUNT 125
57  ;                 3) STOP PULSE TO DECELERATE TO ZERO VELOCITY
58  ;                 4) ENTER STOP LOCK ROUTINE -- MAINTAIN IBG COUNT 125
59  ;
60  ;
61  ;    READY    ENABLES STOP LOCK
62  ;
63  ;
64  ;    REWIND   HIGH SPEED REVERSE MOTION
65  ;                 1) ADD REWIND REGISTER TO VELOCITY TARGET
66  ;                 2) IF REWIND REGISTER IS ZERO THEN MAINTAIN -125 IPS
67  ;                 3) VELOCITY INTERRUPT IS NOT USED
68  ;
69  ;
70  ;    D/A OUTPUT  NULL = 94 --- MAXIMUM CURRENT = +85/-05 = +8.3V/-8.3V
71  ;
72  ;    HP CARD  USE CURRENT FEEDBACK FOR RUN AND VOLTAGE FEEDBACK FOR STO
73  ;
74  ;oooooooooooooooooooooooooooooooooooooooooooooooooooooooooooooooooooo
75  ;o                                                                  o
76  ;o                        INPUT/OUTPUT MAP                          o
77  ;o                                                                  o
78  ;oooooooooooooooooooooooooooooooooooooooooooooooooooooooooooooooooooo
79  ;
80  ; I/O IS MEMORY MAPPED (NOTE: 1000H AND 9008H ARE EQUIVALENT ADDRESSES)
81  ; THERE IS NO RAM MEMORY -- SUBROUTINES ARE ILLEGAL
82  ; PROGRAM MEMORY IS 0 TO 0FFF
83  ; ADDRESS BIT 12 HIGH: I/O ENABLED; ROM DISABLED
84  ; ADDRESS BITS 11 AND 12 HIGH: I/O AND ROM DISABLED
85  ;-------------------------------------------------------------------
86  ;
87  ;            Relative port addressing within memory-map
88  ;
89
90
91
92
93  POSTN:  EQU  0                                         0000
94  VMSB:   EQU  1                                         0001
95  VLSB:   EQU  2                                         0002
96  VSEQ:   EQU  3                                         0003
97  MOTR:   EQU  4                                         0004
98  CMD:    EQU  5                                         0005
99  CONT:   EQU  6                                         0006
100 REW:    EQU  7                                         0007
101                                                        0000
102 ;
103 ;
104 ;========================IBG COUNT REGISTER=========================
105 ;
106 POSITION: EQU  1000H        IBG POSITION CNT REG   SET IBG COUNTER  1000
107                                                    STOP
```

```
108    ;                                                     END OF GAP
109    ;
110    ;*********VELOCITY REGISTER MOST SIGNIFICANT BYTE*********
111    ;
112 1001   VELMSB:   EQU   1001H       VELOCITY COUNT BITS 8,9,A,B
113    ;
114 0005   SEL125:   EQU   5           SELECT BIT FOR 125 IPS (ACTIVE LOW)
115 0006   SEL75:    EQU   6           SELECT BIT FOR 75 IPS (ACTIVE LOW)
116 0007   SEL50:    EQU   7           SELECT BIT FOR 50 IPS (ACTIVE LOW)
117    ;
118    ;*********VELOCITY REGISTER LEAST SIGNIFICANT BYTE*********
119    ;
120 1002   VELOCITY: EQU   1002H       VELOCITY CNT,NUMBER OF CLOCKS BETWEEN TACHS
121    ;                                CLEARS INTERRUPT FLIP-FLOP) CLOCK= .228 NAN
122    ;
123    ;
124    ;*********VELOCITY OUTPUT REGISTER*********
125    ;
126 1003   VELTEST:  EQU   1003H       VELOCITY REGISTER FOR SEQUENCER 'A' BUS
127    ;..
128    ;
129    ;*********D/A CONVERTER PRESET REGISTER*********
130    ;
131 1004   MOTOR:    EQU   1004H       OUTPUT TO D/A CONVERTER FOR CAPSTAN MOTOR
132    ;..
133    ;
134    ;*********          COMMAND REGISTER          *********
135    ;
136 1005   COMMAND:  EQU   1005H       COMMANDS INPUT REGISTER
137    ;
138 0000   POLARITY: EQU   0           POLARITY TEST BIT
139 0001   PWRSAFE:  EQU   1           POWER SAFE LINE STATUS
140 0002   IBGCNTR:  EQU   2           IBG COUNT ENABLE (ACTIVE LOW)
141 0003   HP:       EQU   3           HP card present test
142 0004   RWND:     EQU   4           REWIND SIGNAL FOR CAPSTAN (ACTIVE LOW)
143 0005   READY:    EQU   5           READY SIGNAL FOR CAPSTAN (ACTIVE LOW)
144 0006   FORWARD:  EQU   6           FORWARD MOTION COMMAND (ACTIVE LOW)
145 0007   GO:       EQU   7           GO COMMAND (ACTIVE LOW)
146    ;
147    ;*********          CONTROL REGISTER          *********
148    ;
149 1006   CONTROL:  EQU   1006H       CONTROL OUTPUTS
150    ;
151 0000   NMIENBL:  EQU   0           NMI ENABLE LINE
152 0001   TESTLED:  EQU   1           TEST LED OUTPUT
153 0002   PARKED:   EQU   2
154    ;
155    ;*********          REWIND REGISTER           *********
156    ;
157 1007   REWIND:   EQU   1007H       REWIND INPUT FROM SEQUENCER ('B' BUS)
158    ;..
159    ;
160 4200   CRTBUF:   EQU   4200H       (CRT display for debugging)
161 0842   SHOWDE:   EQU   0842H
162 0877   SHOWBC:   EQU   0877H
```

```
SHOWA:          EQU     0BBFH

;**************************************************************
;*                                                            *
;*              REGISTER ASSIGNMENTS                          *
;*                                                            *
;**************************************************************

;
;       REGISTER BANK 0         B       FORWARD TRIM
;                               C       REVERSE TRIM
;                               DE      TIME DELAY COUNTER
;                               D       DIRECTION FLAG FOR STOP (BIT 0)
;                               HL      ADDRESS POINTER (START)/(STOP)
;                               H       STOP LOCK NULL (STOP LOCK)
;                               L       LAST POSITION (STOP LOCK)
;
;       REGISTER BANK 1         B'      TACH LINE COUNT
;                               C'      TRIM IN USE
;                               DE'     LOOKUP TABLE POINTER (ACC)
;                               D'      ERROR INTEGRATOR (RUN)
;                               E'      VELOCITY COUNT (RUN)
;                               HL'     I/O POINTER
;                               A'      TEMPORARY STORAGE
;
;                               IX      INTERRUPT VECTOR
;                               IY      SSTACK POINTER RESET CONSTANT
;                               I       D/A NULL        BITS 0, 1, 2
;                                                       BITS 3, 4
;                                       SET TO '1'      BIT 7
;                                       NULL POLARITY
;
;*******         CONSTANTS
;

NULL:           EQU     94              MOTOR NOMINAL NULL COMMAND
NULLMIN:        EQU     86
MAXSTP:         EQU     4EH             MAXIMUM CURRENT COMMAND TO STOP
MAX:            EQU     85              MAXIMUM CURRENT COMMAND
MASK:           EQU     0FH             VELOCITY MSB MASK
BANK:           EQU     7               Z80 REGISTER BANK SELECT
LEDNMIOF:       EQU     2               LED OFF AND NMI DISABLED
NOLEDNMI:       EQU     3               LED OFF AND NMI ENABLED
NULLPOL:        EQU     7               NULL POLARITY
STOPDIST:       EQU     125             STOP DISTANCE
STOPDIR:        EQU     0               STOP DIRECTION FLAG
SSTACK:         EQU     4000H
INTEGR:         EQU     80H             servo integrator constant
;
```

```
;***************************************
;*                                     *
;*          INTERRUPT STRUCTURE        *
;*                                     *
;***************************************

; NON-MASKABLE INTERRUPT    SET ON +GO; EXECUTES 'GO' ROUTINE AT 6
;                           NMI INPUT IS DISABLED BY BIT 0 OF 'CON

; MASKABLE INTERRUPT        SET ON TACH LINE BY VELOCITY SEQUENCER
; (MODE 1)                  FLIP-FLOP (K42) LATCHES INTERRUPT
;                           FLIP-FLOP CLEARED BY READ TO 'VELTEST'
;                           EXECUTES ROUTINE AT 38H

;***************************************
;*                                     *
;*         INITIALIZATION ROUTINE      *
;*                                     *
;***************************************

0000                    NOP                     THIS REPROGRAMS 'RESET' KEY TO PERFORM A 'BREAK'
A0:
0000  00                NOP
0001  00                NOP
0002  00

;
                        ;
                        ;
0003  AF        START:  XOR     A                       SET TO 00,00,00 FOR EPROM
0004  32 0B 10          LD      (CONTROL),A             TEST LED ON,NMI DISABLE,CAPSTAN PARKED BIT
0007  F3                DI
0008  C3 65 05          JP      NULLSET                 FIND D/A NULL
                        ;
0010                    ORG     10H
0010  C3 42 08          JP      SHOWDE                  DISPLAY DE AND RETURN
                        ;
0018                    ORG     18H
0018  C3 77 08          JP      SHOWBC
                        ;
0020                    ORG     20H
0020  3A 00 10          LD      A,(1000H)
0023  C3 8F 0B          JP      SHOWA
0026
                        ;
0030                    ORG     30H
0030  C3 44 D4  A30:    JP      0D444H                  SOFTWARE BREAK -- AMDS SYSTEM
0033
0033                    ;;
```

```
;ooooooooooooooooooooooooooooooooooooooooooooooooooooo
;o                      VELOCITY INTERRUPT            o
;o         ON PHASE A TACH (IF INTERRUPTS ARE ENABLED) o
;ooooooooooooooooooooooooooooooooooooooooooooooooooooo
;
                ORG     38H
;
0038  DD E9   VELINT: JP      (IX)            VECTOR TO START/RUN ROUTINE (SPEED DEPENDEN
;
;ooooooooo
;         COMMAND IDLE LOOP
;ooooooooo
;
003A  ED 57   PREIDLE: LD     A,I                     0: compute real_null for motor
003C  CB 7F           BIT     NULLPOL,A
003E  20 08           JR      NZ,PREID
0040  E6 07           AND     7H
0042  ED 44           NEG
0044  C6 5E           ADD     A,NULL                          add negative bias
0046  18 04           JR      PREIDL
0048  E6 07   PREID:  AND     7H
004A  C6 5E           ADD     A,NULL                          add positive bias
004C  32 04 10 PREIDL: LD     (MOTOR),A
;
004F          IDLE:
004F  3E 02           LD      A,2                     0: disable NMI, reset park-bit
0051  32 06 10         LD     (CONTROL),A            0:
0054  3A 05 10         LD     A,(COMMAND)            0: TEST -GO
0057  CB 7F           BIT     GO,A
0059  CA 66 00        JP      Z,GOINT
005C  CB 6F   IDLE1:  BIT     READY,A                 0: TEST -RDY
005E  CA 48 03        JP      Z,STOPLOCK
0061  18 F1           JR      IDLE1
;
;ooooooooooooooooooooooooooooooooooooooooooooooooooooo
;o                                                    o
;o                      GO INTERRUPT                  o
;o                                                    o
;ooooooooooooooooooooooooooooooooooooooooooooooooooooo
;
                ORG     66H             (NMI VECTOR)
;
; ROUTINE MUST START AT ADDRESS 66H       (NMI VECTOR)
;
0066  3E 02   GOINT:  LD      A,LEDNMIOF      7; DISABLE NMI,RES CAPSTAN PARKED BIT
0068  32 06 10        LD      (CONTROL),A     7;
;
```

| | | | | | | |
|---|---|---|---|---|---|---|
| 325 | 006B | CB 7C | | BIT | BANK,H | 7; TEST REGISTER BANK SELECTION |
| 326 | 006D | CA 71 00 | | JP | Z,GOINT1 | 0; SELECT REGISTER BANK 0 |
| 327 | 0070 | D9 | | EXX | | 0; |
| 328 | | | | | | |
| 329 | 0071 | 3E 00 | | LD | A,0 | 0; |
| 330 | 0073 | 32 03 10 | | LD | (VELTEST),A | 0; SET VELOCITY COUNT TO SEQUENCER TO '00' |
| 331 | | | | | | |
| 332 | | | GOINT1: | | | |
| 333 | 0076 | 21 01 10 | | LD | HL,VELMSB | 0; LOAD VELOCITY MSB INPUT |
| 334 | 0079 | 7E | | LD | A,(HL) | 0; |
| 335 | 007A | BE | | CP | (HL) | 0; VERIFY STABLE INPUT |
| 336 | 007B | 20 FC | | JR | NZ,GOINT2 | 0; |
| 337 | 007D | E6 OF | | AND | MASK | 0; |
| 338 | 007F | 1E 55 | | LD | E,MAX | 0; PRESET CURRENT LIMIT |
| 339 | 0081 | FE 02 | | CP | 2 | 0; |
| 340 | 0083 | D2 F3 00 | | JP | NC,ACC125 | 0; NORMAL STOP TIME |
| 341 | | | | | | |
| 342 | 0086 | FE 01 | | CP | 1 | 0; |
| 343 | 0088 | 28 3F | | JR | Z,GOINT5 | 0; SHORT GO-DOWN |
| 344 | | | | | | |
| 345 | | | ;••••••• VELOCITY > 96 IPS | | | |
| 346 | 008A | 21 02 10 | GOINT3: | LD | HL,VELOCITY | 0;LOAD VELOCITY COUNT LSB |
| 347 | 008D | 7E | | LD | A,(HL) | 0; |
| 348 | 008E | BE | | CP | (HL) | 0; |
| 349 | 008F | 20 F9 | | JR | NZ,GOINT3 | 0; |
| 350 | 0091 | 5F | | LD | E,A | 0; |
| 351 | | | | | | |
| 352 | 0092 | 3A 01 10 | | LD | A,(VELMSB) | 0; |
| 353 | 0095 | E6 OF | | AND | MASK | 0; |
| 354 | 0097 | FE 00 | | CP | 0 | 0; |
| 355 | 0099 | 20 CB | | JR | NZ,GOINT | 0;BAD INPUT; TRY AGAIN |
| 356 | | | | | | |
| 357 | 009B | 7B | | LD | A,E | 0; |
| 358 | 009C | FE 9B | | CP | 155 | 0; |
| 359 | 009E | DA 03 00 | | JP | C,START | 0;CAPSTAN RUN-AWAY |
| 360 | | | | | | |
| 361 | 00A1 | 2E 05 | | LD | L,CMD | 0; Index HL to command reg |
| 362 | 00A3 | CB 76 | | BIT | FORWARD,(HL) | 0; |
| 363 | 00A5 | 1E 34 | | LD | E,NULL-(MAX/2) | 0; set current limit for reverse |
| 364 | 00A7 | C2 44 04 | | JP | NZ,ST125R | 0; |
| 365 | | | | | | |
| 366 | 00AA | FE D2 | | CP | 210 | 0; |
| 367 | 00AC | 38 06 | | JR | C,NOSTOP | 0; |
| 368 | 00AE | 26 00 | | LD | H,0 | 0; |
| 369 | 00B0 | 6F | | LD | L,A | 0; |
| 370 | 00B1 | C3 DE 00 | | JP | GOINT6 | 0; |
| 371 | | | | | | |
| 372 | | | NOSTOP: | | | |
| 373 | 00B4 | 78 | | LD | A,B | 1; |
| 374 | 00B5 | D9 | | EXX | | 1; |
| 375 | 00B6 | 4F | | LD | C,A | 1; |
| 376 | 00B7 | 32 04 10 | | LD | (MOTOR),A | 1;CAPSTAN SPEED ABOVE 110 IPS |
| 377 | 00BA | 5F | | LD | E,A | 1; |
| 378 | 00BB | 16 07 | | LD | D,.HIGH.(TABLE2) | 1;SET PAGE POINTER |
| 379 | 00BD | 21 01 90 | | LD | HL,09001H | 1; INITIALIZE I/O POINTER TO VELOCITY INPUT |

```
380                            LD    IX,ST125F3    1;  CLEAR PENDING INTERRUPT
381   00C0  DD 21 E5 01         LD    A,(VELOCITY) 1;
382   00C4  3A 02 10            EI
383   00C7  FB                  HALT
384   00C8  76
385                         ; VELOCITY GREATER THAN 48 IPS
386                         ;
387   00C9  21 02 10     GOINT5: LD   HL,VELOCITY   0; INPUT VELOCITY COUNT LSB
388   00CC  7E                   LD   A,(HL)        0;
389   00CD  BE                   CP   (HL)          0;
390   00CE  20 F9                JR   NZ,GOINT5     0; BAD INPUT TRY AGAIN
391   00D0  5F                   LD   E,A           0;
392                         ;
393   00D1  3A 01 10             LD   A,(VELMSB)    0; VERIFY VELOCITY COUNT MSB IS STILL GOOD
394   00D4  E6 0F                AND  MASK          0;
395   00D6  FE 01                CP   1             0;
396   00D8  C2 B8 00             JP   NZ,GOINT      0; BAD INPUT TRY AGAIN
397   00DB  28 01                LD   H,1           0;
398   00DD  68                   LD   L,E           0;
399                         ;
400                         ; LOOK-UP CURRENT LIMIT
401                         ;
402                         ;
403   00DE  29           GOINT6: ADD  HL,HL         0; MULTIPLY BY 8
404   00DF  29                   ADD  HL,HL         0;
405   00E0  29                   ADD  HL,HL         0;
406   00E1  3E A1                LD   A,.LOW.(TABLE2) 0; COMPUTE LOOK-UP TABLE ADDRESS
407   00E3  84                   ADD  A,H           0;
408   00E4  6F                   LD   L,A           0;
409   00E5  26 07                LD   H,.HIGH.(TABLE2) 0;
410   00E7  5E                   LD   E,(HL)        0; LOOK-UP MAXIMUM ACCELERATE CURRENT
411   00E8  3A 05 10             LD   A,(COMMAND)   0;
412                         ;
413                         ; THE NEXT TEST SHOULD BE "BIT HP"..BUT WAS CHANGED SO TOBE
414                         ; COMPATIABLE WITH THE V.A02 EPROM...WHICH IS IN ERROR!!!
415                         ;
416                         ;
417                         ;
418   00EB                  ;
419   00EB  CB 77                BIT  FORWARD,A                     test for HP card present
420   00ED  28 04                JR   Z,ACC125
421   00EF  3E 14                LD   A,14H                         max that can be added (unless TABLE2 cha
422   00F1  83                   ADD  A,E
423   00F2  5F                   LD   E,A
425                         ;°°°°°°°°°°°°°°°°°°°°°°°°°°°°°°°°°°°°°°°°°°°°°°°°°°°
426                         ;°                                                 °
427                         ;°           ACCELERATION  CURRENT  PROFILE        °
428                         ;°                                                 °
429                         ;°°°°°°°°°°°°°°°°°°°°°°°°°°°°°°°°°°°°°°°°°°°°°°°°°°°
430                         ;
431                         ; RAMP UP +CURRENT
432                         ;
433                         ;
434   00F3  3A 05 10     ACC125: LD   A,(COMMAND)   0;
```

```
435                              BIT   FORWARD,A          0:FORWARD?
436  00F6  CB 77                 JR    NZ,ACC125R         0:NO!
437  00F8  20 10                                          0:
438                                                       0:
439  00FA  3E 5E         ACC125N: LD    A,NULL            0:
440  00FC  83                    ADD   A,E                0:
441  00FD  5F                    LD    E,A                0:
442  00FE  3E 68                 LD    A,NULL+10          0:CURRENT RAMP
443  0100  C6 03         ACC125A: ADD   A,3               0:
444  0102  32 04 10              LD    (MOTOR),A          0:TEST FOR MAXIMUM CURRENT
445  0105  BB                    CP    E                  0:
446  0106  38 F8                 JR    C,ACC125A         0:
447  0108  18 0E                 JR    ACC125B            0:
448                    ; RAMP UP -CURRENT
449
450  010A  3E 5E         ACC125R: LD    A,NULL            0:SUBTRACT CURRENT LIMIT FROM NULL
451  010C  93                    SUB   E                  0:
452  010D  5F                    LD    E,A                0:
453  010E  3E 54                 LD    A,NULL-10          0:CURRENT RAMP
454  0110  D6 03         ACC125S: SUB   3                 0:
455  0112  32 04 10              LD    (MOTOR),A          0:TEST FOR MAXIMUM CURRENT
456  0115  BB                    CP    E                  0:
457  0116  30 FB                 JR    NC,ACC125S         0:
458
459                    ; HOLD CURRENT TILL VELOCITY = 85 IPS
460
461  0118  DD 21 24 01   ACC125B: LD    IX,ACC125C         0:LOAD VELOCITY INTERRUPT ADDRESS
462  011C  31 00 40              LD    SP,SSTACK                REFRESH SSTACK POINTER
463  011F  3A 02 10              LD    A,(VELOCITY)       0: CLEAR ANY PENDING INTERRUPT
464  0122  FB                    EI                       0:
465  0123  76                    HALT                     0:
466
467  0124  3A 01 10      ACC125C: LD    A,(VELMSB)         0:LOOK FOR VELOCITY COUNT < 200H
468  0127  E6 0F                 AND   MASK               0:
469  0129  FE 01                 CP    1                  0:
470  012B  28 15                 JR    Z,ACC125E          0:
471  012D  FE 00                 CP    0                  0:
472  012F  28 3C                 JR    Z,ACC125J          0:
473  0131  3A 05 10              LD    A,(COMMAND)        0:
474  0134  CB 7F                 BIT   GO,A               0:TEST GO FOR SHORT GO UP
475  0136  28 08                 JR    Z,ACC125D          0:
476  0138  CB 77                 BIT   FORWARD,A          0:
477  013A  CA 58 02              JP    Z,EXITGOF1         0:
478  013D  C3 5F 02      ACC125D: JP    EXITGDR1
479  0140  FB                    EI
480  0141  76                    HALT
481
482  0142  3A 02 10      ACC125E: LD    A,(VELOCITY)       SYNC TO VELOCITY COUNT 180H
483  0145  FE F0                 CP    0F0H
484  0147  30 F7                 JR    NC,ACC125D
485  0149  D6 60                 SUB   60H
486  014B  38 04                 JR    C,ACC125G
487  014D  D6 08         ACC125F: SUB   8                DELAY .59 USEC FOR EACH COUNT OF VELOCITY E
488  014F  30 FC                 JR    NC,ACC125F                 (4.8 USEC PER LOOP)
```

```
                              ;**********
                              ACC125G:    RAMP DOWN CURRENT
489  0151  3A 05 10           ACC125G:  LD   A,(COMMAND)
490
491                           ;
492                           ACCHIS:   BIT  FORWARD,A       FORWARD MOTION?
493  0154  CB 77                        JP   NZ,ACC125T
494  0156  C2 37 04                     BIT  7F,A
495  0159  CB 7F                        JP   NZ,EXITGOFI
496  015B  C2 58 02
497                           ;
498  015E  7B                 ACC125H:  LD   A,E            RAMP CURRENT DOWN
499  015F  D6 04                        SUB  4
500  0161  5F                           LD   E,A
501  0162  32 04 10                     LD   (MOTOR),A
502  0165  00                           NOP
503  0166  00                           NOP
504  0167  FE A8                        CP   168            LOOK FOR RAMP END POINT
505  0169  30 F3                        JR   NC,ACC125H
506  016B  18 08                        JR   ST125F
507
508  016D  3A 05 10           ACC125J:  LD   A,(COMMAND)
509  0170  CB 77                        BIT  FORWARD,A
510  0172  C2 44 04                     JP   NZ,ST125R
511
512                           ;**********
513                           ;         INITIALIZE REGISTER BANK 1 REGISTERS
514                           ;
515  0175  78                 ST125F:   LD   A,B            0;SET FORWARD TRIM
516  0176  09                           EXX                 1;
517  0177  4F                           LD   C,A            1;
518
519
520  0178  D9                           EXX                 0;
521  0179  7B                           LD   A,E            0; RAMP CURRENT DOWN
522  017A  D9                           EXX                 1;
523  017B  D6 03                        SUB  3              1;
524  017D  32 04 10                     LD   (MOTOR),A      1;
525  0180  5F                           LD   E,A            1;
526
527  0181  16 07                        LD   D,.HIGH.(TABLE3) 1;SET PAGE POINTER
528  0183  21 01 90                     LD   HL,09001H      1;INITIALIZE I/O POINTER TO VELOCITY INPUT
529  0186  DD 21 97 01                  LD   IX,ST125F1     1;
530  018A  3A 02 10                     LD   A,(VELOCITY)   1;CLEAR PENDING INTERRUPT
531  018D  FB                           EI                  1;
532                           ;
533  018E  7B                 ST125FA:  LD   A,E            1;
534  018F  D6 01                        SUB  1              1;WAIT FOR NEXT TACH LINE
535  0191  32 04 10                     LD   (MOTOR),A      1;
536  0194  5F                           LD   E,A            1;
537  0195  18 F9                        JR   ST125FA        1;
538
539                           ;**********
540                           ;         USE LOOK-UP TABLES TO ACCELERATE TO 115 IPS    (1/2 GAIN)
541                           ;
542  0197  7E                 ST125F1:  LD   A,(HL)         1;LOAD VELOCITY COUNT MSB
543  0198  E8 0F                        AND  MASK           1;
```

| | | | | | |
|---|---|---|---|---|---|
| 544 | 019A | FE 00 | | CP | 0 ;VELOCITY > 96 IPS? |
| 545 | 019C | CA C6 01 | | JP | Z,ST125F2 ; |
| 546 | 019F | FE 01 | | CP | 1 ; |
| 547 | 01A1 | C2 B4 01 | | JP | NZ,ST125F1A ;COMPUTE LOOK-UP TABLE ADDRESS |
| 548 | 01A4 | 2C | | INC | L ; |
| 549 | 01A5 | 7E | | LD | A,(HL) ; |
| 550 | 01A6 | CB 3F | | SRL | A ; |
| 551 | 01A8 | CB 3F | | SRL | A ; |
| 552 | 01AA | CB 3F | | SRL | A ; |
| 553 | 01AC | C6 81 | | ADD | A,.LOW.(TABLE3) ; |
| 554 | 01AE | 5F | | LD | E,A ; |
| 555 | 01AF | 1A | | LD | A,(DE) ;LOOK-UP DESIRED CURRENT |
| 556 | 01B0 | 81 | | ADD | A,C ; |
| 557 | 01B1 | 32 04 10 | | LD | (MOTOR),A ;OUTPUT CURRENT |
| 558 | 01B4 | 2E 01 | ST125F1A: | LD | L,1 ; |
| 559 | 01B6 | 31 00 40 | | LD | SP,SSTACK ; |
| 560 | 01B9 | 3A 02 10 | | LD | A,(VELOCITY) ; |
| 561 | 01BC | 3A 05 10 | | LD | A,(COMMAND) ; |
| 562 | 01BF | CB 7F | | BIT | 7,A ; |
| 563 | 01C1 | C2 57 02 | | JP | NZ,EXITGOF ; |
| 564 | 01C4 | FB | | EI | ;CLEAR INTERRUPT FLIP-FLOP |
| 565 | 01C5 | 76 | | HALT | ; |
| 566 | | | ; | | |
| 567 | | | ; | | |
| 568 | 01C6 | 2C | ST125F2: | INC | L |
| 569 | 01C7 | 7E | | LD | A,(HL) ;LOAD VELOCITY COUNT |
| 570 | 01C8 | FE CD | | CP | 205 ;TEST FOR END OF LOOK-UP TABLE |
| 571 | 01CA | 38 19 | | JR | C,ST125F3 ; |
| 572 | 01CC | 2F | | CPL | ;COMPLEMENT SPEED COUNT |
| 573 | 01CD | 23 | | INC | HL ;POINT TO VELOCITY OUTPUT REGISTER |
| 574 | 01CE | 77 | | LD | (HL),A ;OUTPUT VELOCITY COUNT TO SEQUENCER |
| 575 | 01CF | 2F | | CPL | ; |
| 576 | 01D0 | CB 3F | | SRL | A ;DIVIDE BY 2 |
| 577 | 01D2 | 5F | | LD | E,A ;SET UP LOOK-UP TABLE ADDRESS |
| 578 | 01D3 | 1A | | LD | A,(DE) ; |
| 579 | 01D4 | 81 | | ADD | A,C ; |
| 580 | 01D5 | 2C | | INC | L ;POINT TO MOTOR |
| 581 | 01D6 | 77 | | LD | (HL),A ;OUTPUT CURRENT TO MOTOR |
| 582 | | | ; | | |
| 583 | 01D7 | 2C | | INC | L ;POINT TO COMMAND REGISTER |
| 584 | 01D8 | 7E | | LD | A,(HL) ; |
| 585 | 01D9 | CB 7F | | BIT | 7,A ;GO COMMAND? |
| 586 | 01DB | C2 57 02 | | JP | NZ,EXITGOF ;NO! |
| 587 | | | ; | | |
| 588 | 01DE | 31 00 40 | ST125F3: | LD | SP,SSTACK ;REFRESH SSTACK POINTER |
| 589 | 01E1 | 2E 01 | | LD | L,1 ; |
| 590 | 01E3 | FB | | EI | ; |
| 591 | 01E4 | 76 | | HALT | ; |
| 592 | | | ; | | |
| 593 | 01E5 | 16 80 | | LD | D,INTEGR ;INITIALIZE INTEGRATOR |
| 594 | 01E7 | 79 | | LD | A,C ; |
| 595 | 01E8 | D6 BF | | SUB | 191 ;ADJUST OFFSET FOR 1 AMP RUNNING CURRENT |
| 596 | 01EA | 4F | | LD | C,A ; |
| 597 | 01EB | 2E 02 | | LD | L,2 ;POINT TO VELOCITY REGISTER |

```
598  01ED  DD 21 F1 01              LD    IX,RUN125F      ;SET FORWARD MOTION ROUTINE
599  01F1
600  01F1
601                    ;°°°°°°°°°°°°°°°°°°°°°°°°°°°°°°°°°°°°°°°°°°°°°°°°°°°°°°°°°°°°°°°
602                    ;°                                                              °
603                    ;°                       RUN 125 IPS FORWARD                    °
604                    ;°     NOTE:  Integrator set for 128 TACH                       °
605                    ;°                       12 msec (0.7 inch or 4K record         °
606                    ;°°°°°°°°°°°°°°°°°°°°°°°°°°°°°°°°°°°°°°°°°°°°°°°°°°°°°°°°°°°°°°°
607
608  01F1  7E          RUN125F1   LD    A,(HL)          ;LOAD VELOCITY COUNT / CLEAR INTERRUPT FLI
609  01F2  2F                     CPL                   ;COMPLEMENT SPEED COUNT
610  01F3  2C                     INC   L               ;POINT TO VELOCITY OUTPUT REGISTER (VELTES
611  01F4  77                     LD    (HL),A          ;  OUT VELOCITY COUNT TO SEQUENCER
612  01F5  2F                     CPL
613  01F6  5F                     LD    E,A
614  01F7  81                     ADD   A,C             ;  ADD TRIM
615  01F8  30 51                  JR    NC,ERROR        ;TEST FOR SPEED OUT OF LIMITS
616  01FA  2C                     INC   L
617  01FB  77                     LD    (HL),A          ;OUTPUT ACCELERATE COMMAND
618  01FC
619  01FC
620  01FC
621                    ;°°°°°°°°° TEST COMMANDS (EVERY TACH LINE)
622                    ;
623  01FC  2C                     INC   L               ;POINT TO COMMAND REGISTER
624  01FD  7E                     LD    A,(HL)          ;LOAD COMMAND BITS
625  01FE  E6 C0                  AND   0C0H            ;TEST FOR STOP OR REVERSE COMMANDS
626  0200  20 2C                  JR    NZ,EXIT125F     ;
627
628  0202  31 00 40               LD    SP,SSTACK       ;RESET SSTACK POINTER
629  0205  2E 02                  LD    L,2             ;RESET I/O POINTER
630  0207
631  0207
632                    ;°°°°°°°°° TRIM INTEGRATION ROUTINE
633                    ;
634  0207  7B                     LD    A,E
635  0208  D6 C4                  SUB   198
636  020A  38 12                  JR    C,RUN125F2      ;TEST COUNT FOR ERROR
637  020C  28 03                  JR    Z,RUN125F0      ;NEGATIVE ERROR
638                                                     ;ZERO ERROR
639  020E  14                     INC   D               ;INCREMENT INTEGRATOR (CAPSTAN SLOW)
640  020F  28 02         RUN125F0: JR   Z,RUN125F1      ;ADJUST TRIM IF COUNTER OVERFLOW
641  0211  FB                     EI
642  0212  76                     HALT
643
644
645                    RUN125F1:
646  0213  16 80                  LD    D,INTEGR        ;reset integrator
647  0213  0C                     INC   C               ;  INCREMENT TRIM REGISTER
648  0215  3E 80                  LD    A,080H
649  0216  B9                     CP    C
650  0218  30 01                  JR    NC,RUN125FA     ;TEST UPPER LIMIT OF TRIM
651  0219
```

```
652  0218  4F              RUN125FA:  LD    C,A
653  021C  FB                         EI
654  021D  76                         HALT
655
656  021E  15              RUN125F2:  DEC   D                  1 ;DECREMENT INTEGRATOR (CAPSTAN FAST)
657  021F  28 02                      JR    Z,RUN125F3         1 ;
658  0221  FB                         EI                       1 ;
659  0222  76                         HALT                     1 ;
660  ;
661  0223  16 80           RUN125F3:  LD    D,INTEGR           1 ; reset integrator
662  0225  0D                         DEC   C                  1 ;DECREMENT TRIM REGISTER
663  0226  3E 70                      LD    A,70H              1 ;
664  0228  B9                         CP    C                  1 ;
665  0229  38 01                      JR    C,RUN125F4         1 ;TEST LOWER TRIM LIMIT
666  022B  4F                         LD    C,A                1 ;
667  022C  FB              RUN125F4:  EI                       1 ;
668  022D  76                         HALT                     1 ;
669
670  ;******** EXIT RUN ROUTINE
671  ;
672  022E  F3              EXIT125F:  DI                       1 ;
673  022F  79                         LD    A,C                1 ;
674  0230  C6 BF                      ADD   A,191              1 ;CONVERT TO D/A OFFSET
675  0232  D9                         EXX                      1 ;CONVERT TO D/A OFFSET (ADD VELOCITY TARG
676  0233  47                         LD    B,A                0 ;SAVE NEW D/A OFFSET FOR +125 IPS
677
678  0234  3E 02                      LD    A,2                0 ;
679  0236  32 06 10                   LD    (CONTROL),A        0 ;DISABLE NMI,TURN LED OFF,RES.CAPS.PARKED
680  0239  3A 05 10                   LD    A,(COMMAND)        0 ;
681  023C  CB 5F                      BIT   HP,A                  ; test for HP card present
682  023E  3E 10                      LD    A,NULL-MAXSTP         ; SET MAXIMUM DECELERATE CURRENT
683  0240  28 02                      JR    Z,NOHP
684  0242  D6 0A                      SUB   10                    ; Increase stopping current for HP
685
686  0244  32 04 10        NOHP:      LD    (MOTOR),A          0 ;
687                        ;
688  0247  16 00                      LD    D,0                0 ;
689  0249  18 1B                      JR    STOP125            0 ;SET FOWARD STOP FLAG
690
691  ;******** OVERSPEED/UNDERSPEED FAULT
692  ;
693  024B  D9              ERROR:     EXX                      1 ;SELECT REGISTER BANK 0
694  024C  3A 01 10                   LD    A,(VELMSB)         0 ;
695  024F  E6 0F                      AND   MASK               0 ;
696  0251  C2 66 00                   JP    NZ,GOINT           0 ;UNDER SPEED EXIT
697  0254  C3 03 00                   JP    START              0 ;OVER SPEED EXIT
```

```
                                        ************************************
                                        *                                  *
                                        *            S T O P               *
                                        *                                  *
                                        *     ,----------------------------*
                                        *     | NOTE: unless otherwise noted STOP routine
                                        *     |       uses register bank-0
                                        *     `----------------------------*
                                        *                                  *
                                        ************************************

;******* MAINTAIN MAXIMUM DECELERATION TO 55 IPS
                                ;
                                ;        EXITGO ENTRIES FROM A SHORT GO-UP TIME
                                ;
0257  D9                        EXITGOF:  EXX
0258  3E 20                     EXITGOF1: LD   A,NULL-(MAXSTP-16)
025A  16 00                               LD   D,0
025C  18 05                               JR   EXITGO
025E  D9                        EXITGOR:  EXX
025F  3E 9C                     EXITGOR1: LD   A,NULL+(MAXSTP-16)
0261  16 01                               LD   D,1
0263  32 04 10                  EXITGO:   LD   (MOTOR),A
                                ;
                                ;********
0266  1E 00                     STOP125:  LD   E,0            ; INITIALIZE COUNTER
0268  FD 21 00 10                         LD   IY,POSITION    ; Index to I/O ports
                                ;
026C  1C                        STOP125A: INC  E
026D  FD 7E 02                            LD   A,(IY+VLSB)
0270  2F                                  CPL                 ; sent velocity to "A"-bus
0271  FD 77 03                            LD   (IY+VSEQ),A
0274  FD CB 05 7E                         BIT  GO,(IY+CMD)    ; command to start capstan set?
0278  20 1D                               JR   NZ,STOP125B    ; NO!
                                ;
027A  CB 42                               BIT  STOPDIR,D      ; EXIT VIA RAMP 1 IF REVERSE MOTION
027C  20 5A                               JR   NZ,RAMP1       ;  (STOP DIRECTION FLAG IS BIT 0 OF "D")
                                ;
027E  7B                                  LD   A,E
027F  FE 04                               CP   4              ; EXIT VIA RAMP 0 IF STOP < 100 USEC
0281  3E 38                               LD   A,NULL-35
0283  38 46                               JR   C,RAMP00       ; SET START POINT FOR RAMP
                                ;
0285  7B                                  LD   A,E
0286  FE 0F                               CP   15             ; EXIT VIA RAMP 0 IF STOP > 300 USEC
0288  30 3F                               JR   NC,RAMP0
                                ;
028A  3E 22                     RAMP2:    LD   A,NULL-80      ; EXIT VIA RAMP 2 IF STOP BETWEEN 100-300 USE
028C  C6 01                               ADD  A,1
028E  32 04 10                            LD   (MOTOR),A
```

| | | | | | |
|---|---|---|---|---|---|
| 758 | 0291 | FE 56 | CP | NULL-8 | |
| 759 | 0293 | 38 F7 | JR | C,RAMP2 | |
| 760 | 0295 | 18 4C | JR | STOP125F | |
| 761 | | | | | |
| 762 | 0297 | | STOP125B: | | |
| 763 | 0297 | FD 7E 01 | LD | A,(IY+VMSB) | VERIFY INPUT |
| 764 | 029A | FD BE 01 | CP | (IY+VMSB) | |
| 765 | 029D | 20 FB | JR | NZ,STOP125B | loop till velocity < 97ips (count <100h) |
| 766 | 029F | E6 0F | AND | MASK | |
| 767 | 02A1 | 28 C9 | JR | Z,STOP125A | |
| 768 | 02A3 | FE 01 | CP | 1 | |
| 769 | 02A5 | C2 E3 02 | JP | NZ,STOP125F | INVALID STOP |
| 770 | | | | | |
| 771 | | | ; Entry for velocity < 97ips | | |
| 772 | | | ; took about 500usec to deaccelerate | | |
| 773 | | | ;*********** | | |
| 774 | | | ;*********** | | |
| 775 | | | | | |
| 776 | | | | | |
| 777 | | | | | |
| 778 | 02A8 | FD 36 03 00 | STOP125C: LD | (IY+VSEQ),0 | set sequencer 'A'-bus =0 |
| 779 | 02AC | FD 7E 02 | LD | A,(IY+VLSB) | VERIFY INPUT |
| 780 | 02AF | FD BE 02 | CP | (IY+VLSB) | |
| 781 | 02B2 | 20 FB | JR | NZ,STOP125C | |
| 782 | | | | | |
| 783 | | | | | SET UP DELAY COUNT |
| 784 | 02B4 | C6 80 | ADD | A,80H | ADD 128 |
| 785 | 02B6 | 30 02 | JR | NC,STOP125E | |
| 786 | 02B8 | 3E FF | LD | A,0FFH | NO DELAY |
| 787 | | | | | |
| 788 | 02BA | | STOP125E: | | |
| 789 | 02BA | FD CB 05 7E | BIT | GO,(IY+CMD) | GO COMMAND? |
| 790 | 02BE | 28 05 | JR | Z,RAMP | YES! |
| 791 | | | | | |
| 792 | 02C0 | C6 0E | ADD | A,14 | delay to approx 65ips |
| 793 | 02C2 | 00 | NOP | | |
| 794 | 02C3 | 30 F5 | JR | NC,STOP125E | |
| 795 | | | | | |
| 796 | 02C5 | CB 42 | BIT | STOPDIR,D | STOP DIRECTION FLAG ON? |
| 797 | 02C7 | 20 0F | JR | NZ,RAMP1 | |
| 798 | | | | | |
| 799 | | | ; 200usec ramp | | |
| 800 | | | ;*********** | | |
| 801 | | | | | |
| 802 | 02C9 | 3E 18 | RAMP: LD | A,NULL-70 | SET STARTING POINT FOR RAMP |
| 803 | 02CB | C6 03 | RAMP00: ADD | A,3 | |
| 804 | 02CD | 32 04 10 | LD | (MOTOR),A | |
| 805 | 02D0 | FE 56 | CP | NULL-8 | |
| 806 | 02D2 | 00 | NOP | | |
| 807 | 02D3 | 00 | NOP | | |
| 808 | 02D4 | 38 F5 | JR | C,RAMP00 | |
| 809 | 02D6 | 18 0B | JR | STOP125F | |
| 810 | | | | | |
| 811 | 02D8 | 3E A4 | RAMP1: LD | A,NULL+70 | |
| 812 | 02DA | D6 03 | RAMP11: SUB | 3 | |

```
813  02DC  32 04 10              LD    (MOTOR),A
814  02DF  FE 66                 CP    NULL+8
815  02E1  30 F7                 JR    NC,RAMP11
816
817  ;;;;;;;;;;;;;
818  ;
819  ;  If IBG enabled
820  ;    set motor current = null
821  ;    while (position count) < 125
822  ;       if 1.2msec timeout
823  ;           enter STOPLOCK
824  ;       if position counter indicates a direction change
825  ;           enter STOPLOCK
826  ;    loop
827  ;    then compute STOP_PULSE
828  ;  else goto IDLE
829
830  ;
831  ;;;;;;;;;;;;;
832  STOP125F:
833  02E3  FD 36 04 5E           LD    (IY+MOTR),NULL    ENABLE NMI,TURN LED OFF,RES CAPS.PARKED
834  ;
835  02E7  FD 36 06 03           LD    (IY+CONT),NOLEDNMI
836  02EB  FD CB 05 58           BIT   IBGCNTR,(IY+CMD)
837  02EF  C2 3A 00              JP    NZ,PREIDLE        exit if IBG COUNTER disabled
838  02F2  16 48                 LD    D,.75             START COUNT
839  02F4  1E D0                 LD    E,0D0H            set 1.2msec timer
840  ;
841  STOP125H:
842  02F6  FD 7E 00              LD    A,(IY+POSTN)
843  02F9  FD BE 00              CP    (IY+POSTN)        VERIFY STABLE INPUT
844  02FC  20 F8                 JR    NZ,STOP125H
845  ;
846  02FE  1C                    INC   E                 TEST TIME LIMIT
847  02FF  28 47                 JR    Z,STOPLOCK
848  ;
849  0301  BA                    CP    D                 TEST FOR direction change
850  0302  30 44                 JR    C,STOPLOCK
851  0304  57                    LD    D,A               save 'last' position
852  ;
853  0305  FE 7D                 CP    125               position = 1257
854  0307  38 ED                 JR    C,STOP125H        WAIT LOOP
855
856  ;;;;;;;;;;;;;
857  ;  COMPUTE AND OUTPUT .7 MSEC STOP PULSE
858  ;
859  ;;;;;;;;;;;;;
860  0309                        STOP125L:
861  ;  ASSEMBLE THE 5 MSB 0 VELOCITY COUNT
862
863  0309  FD 7E 01              LD    A,(IY+VMSB)
864  030C  FD BE 01              CP    (IY+VMSB)
865  030F  20 F8                 JR    NZ,STOP125L
866  0311  E6 0F                 AND   MASK              (EACH BIT = 128 COUNTS)
867  0313  5F                    LD    E,A
```

```
868  0314  FD 7E 02        STOPL1:   LD    A,(IY+VLSB)
869  0317  FD BE 02                  CP    (IY+VLSB)
870  031A  20 FB                     JR    NZ,STOPL1
871  031C  17                        RLA                    MULTIPLY BY 2
872  031D  CB 13                     RL    E
873  031F  3E 08                     LD    D,8              DEFAULT CURRENT
874  0321  3E 85                     LD    A,.LOW.(PULSETBL) COMPUTE LOOK-UP TABLE ADDRESS
875  0323  83                        ADD   A,E
876  0324  FE C4                     CP    .LOW.(PULSETBL+15) TEST FOR END OF TABLE
877  0326  30 04                     JR    NC,STOP125M
878  0328  6F                        LD    L,A
879  0329  26 07                     LD    H,.HIGH.(PULSETBL)
880  032B  56                        LD    D,(HL)           LOOK-UP PULSE CURRENT
881  032C                 STOP125M:
882  032C  FD CB 05 7E             BIT   FORWARD,(IY+CMD) FORWARD MOTION?
883  0330  7A                       LD    A,D
884  0331  28 09                    JR    Z,STOP125N       YES!
885  0333  CB 3F                    SRL   A                NO! USE 3/4 GAIN FOR REVERSE STOP
886  0335  CB 3A                    SRL   D
887  0337  CB 3A                    SRL   D
888  0339  82                       ADD   A,D
889  033A  ED 44           STOP125N: NEG
890  033C  ED 44                    NEG
891  033E  C6 5E                    ADD   A
892  0340  32 04 10                 LD    (MOTOR),A        OUTPUT CURRENT TO MOTOR 894  0343  3E A0                    LD    A,180
895  0345  3D              STOP125P: DEC   A                TIME OUT (.7 MSEC)
896  0346  20 FD                    JR    NZ,STOP125P
897                 ;**************************************************
898                 ;*                                                *
899                 ;*  STOP-LOCK: MAINTAINS 180 COUNT AT:125         *
900                 ;*                                                *
901                 ;*                                                *
902                 ;*                                                *
903                 ;*                                                *
904                 ;**************************************************
905                 ;
906                 ;  COMPUTE real_null
907                 ;
908  0348         STOPLOCK:
909  0348  ED 57                    LD    A,I
910  034A  CB 7F                    BIT   NULLPOL,A
911  034C  20 08                    JR    NZ,SPLK0A
912  034E  E6 07                    AND   7H
913  0350  ED 44                    NEG
914  0352  C6 5E                    ADD   A,NULL           add negative bias
915  0354  18 04                    JR    STPLOCK
916  0356  E6 07           SPLK0A:   AND   7H
917  0358  C6 5E                    ADD   A,NULL           add positive bias
918  035A  32 04 10        STPLOCK:  LD    (MOTOR),A
919  035D  08                       EX    AF,AF'           save real_null
920                 ;
921  035E  3A 05 10                 LD    A,(COMMAND)
```

```
                                AND     24H             TEST FOR -READY AND IBG ENABLED
0361  E6 24                     JP      NZ,IDLE         ENABLE NMI INPUT; TURN OFF TEST LAMP
0363  C2 4F 00                  LD      A,7             SET CAPSTAN PARKED BIT
0366  3E 07
0368  32 06 10                  LD      (CONTROL),A

0368  CB 7C                     BIT     BANK,H          REGISTER BANK ZERO?
036D  28 01                     JR      Z,STP1          YES!
036F  D9                        EXX                     NOISELECT REGISTER BANK 0

0370                    STP1:
0370  08                        EX      AF,AF'          restore real_null
0371  67                        LD      H,A             'H'-reg = real_null 0372  2E 7D                     LD      L,7DH           seed 'LAST POSITION' storage reg ;°°°°°°°°°°°°°°°°°°°°°°°°°°°°°°°°°°°°°°°°°°°°°°°°°°°°°°°°°°°°°°°°°°°°°°°°
;°                                                                       °
;°    STOP LOCK POSITION SERVO                                           °
;°    STOP-LOCK (TARGET = 7DH)                                           °
;°    uses register bank-0                                               °
;° NOTE...no test of command lines during this                           °
;°        20msec timer!!                                                 °
;°                                                                       °
;°°°°°°°°°°°°°°°°°°°°°°°°°°°°°°°°°°°°°°°°°°°°°°°°°°°°°°°°°°°°°°°°°°°°°°°°

STOPLCK: LD     IY,POSITION
0374  FD 21 00 10               LD      DE,1000         SET COUNTER (USED FOR PULSE, DELAY, VELOCIT
0378  11 E8 03                  LD      A,H             NULL CURRENT TO MOTOR
037B  7C
037C  32 04 10                  LD      (MOTOR),A

037F                    SPOS2:
037F  FD 7E 00                  LD      A,(IY+POSTN)
0382  FD BE 00                  CP      (IY+POSTN)      does current position = target position
0385  20 F8                     JR      NZ,SPOS2        JUMP TO OUTPUT ROUTINE IF DIFFERENT
0387  FE 7D                     CP      STOPDIST
0389  20 08                     JR      NZ,SPLK1H 038B  1B                        DEC     DE              AFTER 4000 TESTS RUN CURRENT OUTPUT
038C  7B                        LD      A,E
038D  B2                        OR      D
038E  C2 7F 03                  JP      NZ,SPOS2        complete 20msec delay

;°°
;°   COMPUTE CORRECTION CURRENT
;°°

0391                    SPLK1H:
0391  FD 7E 00                  LD      A,(IY+POSTN)
0394  FD BE 00                  CP      (IY+POSTN)      determine which side of target position
0397  20 F8                     JR      NZ,SPLK1H       do another delay if position = 125
0399  FE 7D                     CP      STOPDIST
039B  28 07                     JR      Z,STOPLCK       current position > target position (125)
039D  30 39                     JR      NC,PASTSTPH
```

```
                                                ; else current position < target position
                                                ;
977  039F  BD              CP   L               COMPARE TO LAST POSITION
978  03A0  6F              LD   L,A             SAVE NEW POSITION
979  03A1  38 10           JR   C,SPLK3H        VELOCITY TOWARDS ZERO POSITION
980  03A3  D6 7D           SUB  STOPDIST
981  03A5  ED 44           NEG
982  03A7  FE 10           CP   18              POS COUNT DIFFERENCE =< 16?
983  03A9  30 06           JR   NC,SPLK1H1      NO!
984  03AB
985  03AB  11 C5 07  SPLK1H1A: LD  DE,STLCKTBL
986  03AE  83              ADD  A,E
987  03AF  5F              LD   E,A
988  03B0  1A              LD   A,(DE)          FETCH TABLE VALUE
989  03B1
990  03B1  18 0E     SPLK1H1: JR  SPLK4H
991  03B3
992  03B3  D6 7D     SPLK3H: SUB  STOPDIST
993  03B5  ED 44           NEG
994  03B7  FE 10           CP   16              POS COUNT DIFFERENCE =< 16?
995  03B9  30 06           JR   NC,SPLK4H       NO!
996  03BB
997  03BB  11 C5 07  SPLK3H1A: LD  DE,STLCKTBL
998  03BE  83              ADD  A,E
999  03BF  5F              LD   E,A
1000 03C0  1A              LD   A,(DE)          FETCH TABLE VALUE
1001 03C1  FE 55     SPLK4H: CP  C,SPLK5H       TEST FOR CURRENT LIMIT
1002 03C3  38 02           JR   C,SPLK5H
1003 03C5  3E 55           LD   A,MAX
1004 03C7  5F        SPLK5H: LD  E,A
1005 03C8  3A 05 10        LD   A,(COMMAND)     POINT TO COMMAND REGISTER
1006 03CB  CB 77           BIT  FORWARD,A       FORWARD MOTION?
1007 03CD  78              LD   A,E
1008 03CE  28 02           JR   Z,SPLK6H        YES!
1009 03D0  ED 44           NEG                  NO!NEGATE ERROR FOR REVERSE COMMAND
1010 03D2  84        SPLK6H: ADD A,H            ADD D/A OFFSET
1011 03D3  32 04 10        LD   (MOTOR),A       MOTOR CURRENT = POSITION ERROR
1012 03D6  18 33           JR   SPLKTIME
1013
1014
1015             ;******** PAST STOP POINT (POSITION > 125)
1016             ;
1017 03D8  BD        PASTSTPH: CP  L
1018 03D9  6F              LD   L,A             SAVE NEW POSITION
1019 03DA  30 0E           JR   NC,SPLK7H
1020 03DC  D6 7D           SUB  STOPDIST
1021 03DE  FE 10           CP   16              POS COUNT DIFFERENCE =< 16?
1022 03E0  30 06           JR   NC,PASTSTP1     NO!
1023
1024 03E2  11 C5 07  PSTSTP1A: LD  DE,STLCKTBL
1025 03E5  83              ADD  A,E
1026 03E6  5F              LD   E,A
1027 03E7  1A              LD   A,(DE)          FETCH TABLE VALUE
1028
1029 03E8  18 0C     PASTSTP1: JR  SPLK8H
```

```
                                ;
1032                            SPLK7H:   SUB   STOPDIST
1033 03EA  D6 7D                          CP    16            POS COUNT DIFFERENCE =< 16?
1034 03EC  FE 10                          JR    NC,SPLK8H     NO!
1035 03EE  30 08                SPLK7H1A:
1036
1037 03F0  11 C5 07                       LD    DE,STLCKTBL
1038 03F3  83                             ADD   A,E           FETCH TABLE VALUE
1039 03F4  5F                             LD    E,A
1040 03F5  1A                             LD    A,(DE)
1041 03F6  FE 55                SPLK8H:   CP    MAX           TEST FOR CURRENT LIMIT
1042 03F8  38 02                          JR    C,SPLK9H
1043 03FA  3E 55                          LD    A,MAX
1044 03FC  5F                             LD    E,A
1045 03FD  3A 05 10             SPLK9H:   LD    A,(COMMAND)
1046 0400  CB 77                          BIT   FORWARD,A     FORWARD MOTION?
1047 0402  7B                             LD    A,E
1048 0403  20 02                          JR    NZ,SPLKAH     NO!
1049 0405  ED 44                          NEG
1050 0407  84                   SPLKAH:   ADD   A,H           MOTOR CURRENT = POSITION ERROR
1051 0408  32 04 10                       LD    (MOTOR),A
1052                            ; •••••••• TIME OUT MAXIMUM CURRENT PULSE
1053                            ;          delay = aprox 650usec
1054                            ;
1055                            SPLKTIME: LD    E,14H         PRESET DELAY COUNTER
1056 040B  1E 14                SPLKTM1:  DEC   E
1057
1058 040D  1D                             JR    Z,STMDEAD
1059 040E  28 1B
1060
1061 0410  3A 05 10                       LD    A,(COMMAND)   GO COMMAND?
1062 0413  CB 7F                          BIT   GO,A          YES!
1063 0415  CA 66 00                       JP    Z,GOINT       NO!TEST RDY, IBG
1064 0418  E6 24                          AND   024H
1065 041A  C2 3A 00                       JP    NZ,PREIDLE
1066
1067                            ;SPOS4
1068 041D  FD 7E 00                       LD    A,(IY+POSTN)  has position changed
1069 0420  FD 8E 00                       CP    (IY+POSTN)
1070 0423  20 F8                          JR    NZ,SPOS4
1071 0425  BD                             CP    L
1072 0426  00                             NOP
1073 0427  00                             NOP
1074 0428  00                             NOP
1075
1076                                       JP    NZ,SPLK1H
1077 0429  18 E2                          JR    SPLKM1        LOOP UNTILL PULSE IS TIMED OUT
1078
1079                            ;
1080                            ;         set 100 usec dead time between current pulses
1081                            ;         to give motor time to move and not over-correct
1082 042B  7C                   STMDEAD:  LD    A,H
1083 042C  32 04 10                       LD    (MOTOR),A
1084 042F  1E 80                          LD    E,80H
1085 0431  1D                   XDELAY:   DEC   E
1086 0432  20 FD                          JR    NZ,XDELAY
```

```
                    JP    STOPLCK
;**************************************
;*                                    *
;*          REVERSE START             *
;*                                    *
;**************************************
;
;****** RAMP CURRENT DOWN
ACC125T:       LD    A,E              ;RAMP CURRENT DOWN
0437  78       ADD   E,4              ;
0438  C8 04    LD    E,A              ;
043A  5F       LD    (MOTOR),A        ;
043B  32 04 10 NOP                    ;
043E  00       NOP                    ;
043F  00       CP    20               ;
0440  FE 14    JR    C,ACC125T        ;
0442  38 F3
;
;****** INITIALIZE REGISTER BANK 1 REGISTERS
;
ST125R:        LD    A,C              ;SET FORWARD TRIM
0444  79       EXX                    ;
0445  D9       LD    C,A              ;
0446  4F
;
0447  D9       EXX                    ;
0448  78       LD    A,E              ;
0449  D9       EXX                    ;
044A  C6 0A    ADD   A,10             ;
044C  32 04 10 LD    (MOTOR),A        ;
044F  5F       LD    E,A              ;
;
0450  16 07    LD    D,.HIGH.(TABLE1) ;SET PAGE POINTER
0452  21 01 10 LD    HL,VELMSB        ;INITIALIZE I/O POINTER TO VELOCITY INPUT
0455  DD 21 66 04 LD IX,ST125R1       ;
0459  3A 02 10 LD    A,(VELOCITY)     ;
045C  FB       EI                     ;
045D  78       LD    A,E              ;
ST125R2:       ADD   A,2              ;
045E  C6 02    LD    (MOTOR),A        ;
0460  32 04 10 LD    E,A              ;
0463  5F       JR    ST125R2          ;
0464  18 F7
;
;******* USE LOOK-UP TABLES TO ACCELERATE TO 115 IPS
;
ST125R1:       LD    A,(HL)           ;LOAD VELOCITY COUNT MSB
0468  7E       AND   MASK             ;
0467  E6 0F    CP    0                ;VELOCITY > 96 IPS?
0469  FE 00    JP    Z,ST125R2        ;
046B  CA 7E 04 LD    SP,SSTACK        ;
046E  31 00 40 LD    A,(VELOCITY)     ;
0471  3A 02 10 LD    A,(COMMAND)      ;
0474  3A 05 10 BIT   GO,A             ;
0477  CB 7F
```

```
1142  0479  C2 5E 02         JP    NZ,EXITGOR
1143  047C  FB               EI
1144  047D  76               HALT
1145
1146  ;
1147  047E  2C       ST125R2: INC   L                ;LOAD VELOCITY COUNT
1148  047F  7E               LD    A,(HL)
1149  0480  2F               CPL                    ;COMPLEMENT SPEED COUNT
1150  0481  23               INC   HL
1151  0482  77               LD    (HL),A           ;OUTPUT VELOCITY COUNT TO SEQUENCER
1152  0483  2F               CPL
1153  0484  FE CD            CP    205              ;IF END OF LOOK-UP TABLE
1154  0486  DA A0 04         JP    C,ST125R3
1155  0489  CB 3F            SRL   A                ;DIVIDE BY 2
1156  048B  5F               LD    E,A              ;SET UP LOOK-UP TABLE ADDRESS
1157  048C  1A               LD    A,(DE)
1158  048D  ED 44            NEG
1159  048F  81               ADD   A,C
1160  0490  2C               INC   L
1161  0491  77               LD    (HL),A           ;OUTPUT CURRENT TO MOTOR
1162
1163  0492  2C               INC   L                ;INPUT COMMAND
1164  0493  7E               LD    A,(HL)
1165  0494  CB 7F            BIT   GO,A             ;GO COMMAND?
1166  0496  C2 5E 02         JP    NZ,EXITGOR       ;NO!
1167  0499  31 00 40         LD    SP,SSTACK
1168  049C  2E 01            LD    L,1
1169  049E  FB               EI
1170  049F  76               HALT
1171
1172  04A0  16 80    ST125R3: LD    D,INTEGR         ;INITIALIZE INTEGRATOR
1173  04A2  06 14            LD    B,20
1174  04A4  2E 02            LD    L,2
1175  04A6  DD 21 AC 04      LD    IX,RUN125R       ;SET FORWARD MOTION ROUTINE
1176  04AA  FB               EI
1177  04AB  78               HALT
1179  04AC
1180  ;°°°°°°°°°°°°°°°°°°°°°°°°°°°°°°°°°°
1181  ;°                                °
1182  ;°       RUN 125 IPS REVERSE      °
1183  ;°                                °
1184  ;°°°°°°°°°°°°°°°°°°°°°°°°°°°°°°°°°°
1185  ;
1186  04AC  7E       RUN125R: LD    A,(HL)           ;LOAD VELOCITY COUNT / CLEAR INTERRUPT FLI
1187  04AD  FE 9B            CP    155
1188  04AF  DA 4B 02         JP    C,ERROR
1189  04B2  2F               CPL                    ;COMPLEMENT SPEED COUNT
1190  04B3  2C               INC   L
1191  04B4  77               LD    (HL),A           ;OUTPUT VELOCITY COUNT TO SEQUENCER
1192  04B5  2F               CPL
1193  04B6  5F               LD    E,A
1194  04B7  D6 BF            SUB   191
1195  04B9  ED 44            NEG
1196  04BB  81               ADD   A,C              ;ADD TRIM
1197  04BC  2C               INC   L
```

```
04BD  77              LD    (HL),A        1;'OUTPUT ACCELERATE COMMAND
04BE
04BE
04BE          ;******* TEST COMMANDS (EVERY TACH LINE)
04BE          ;
04BF  2C              INC   L             1;LOAD COMMAND BITS
04BF  7E              LD    A,(HL)
04C0  EE 50           XOR   050H          1;TEST FOR FORWARD AND REWIND COMMANDS
04C2  E6 0C           AND   0C0H          1;TEST FOR STOP COMMAND      (NO REWIND)
04C4  20 45           JR    NZ,EXIT125R   1;
04C6
04C6  31 00 40        LD    SP,SSTACK     1;     RESET SSTACK POINTER
04C9  2E 02           LD    L,02          1;RESET I/O POINTER
04CB
04CB
04CB          ;******* TRIM INTEGRATION ROUTINE
04CB          ;
04CB  10 0E           DJNZ  RUN125RC      1;UPDATE TRIM INTEGRATOR EVERY 3RD TACH LIN
04CD  06 03           LD    B,3           1;RESET TRIM DELAY COUNTER
04CF  7B              LD    A,E           1;TEST COUNT FOR ERROR
04D0  D6 C4           SUB   196           1;
04D2  38 25           JR    C,RUN125R2    1;NEGATIVE ERROR
04D4  28 03           JR    Z,RUN125R0    1;ZERO ERROR
04D6
04D6  15              DEC   D             1;INCREMENT INTEGRATOR (CAPSTAN SLOW)
04D7  28 13           JR    Z,RUN125R1    1;ADJUST TRIM IF COUNTER OVERFLOW
04D9  FB       RUN125R0: EI
04DA  76              HALT
04DB
04DB  3A 07 10 RUN125RC: LD   A,(REWIND)   1;TEST FOR REWIND OFFSET
04DE  FE 00           CP    0
04E0  28 F7           JR    Z,RUN125R0
04E2  FE FF           CP    0FFH          1;ACCEPT 'FF' SAME AS '00'
04E4  28 F3           JR    Z,RUN125R0
04E6
04E6  DD 21 27 05     LD    IX,REWINDR    1;SET REWIND MODE
04EA  FB              EI                  1;
04EB  76              HALT                1;
04EC
04EC  16 80    RUN125R1: LD  D,INTEGR     1;INCREMENT TRIM REGISTER
04EE  0D              DEC   C             1;RESET INTEGRATION REGISTER
04EF  16 80           LD    D,080H        1;
04F1  3E 3E           LD    A,NULL-20H    1;
04F3  B9              CP    C             1;
04F4  38 01           JR    C,RUN125RA    1;TEST UPPER LIMIT OF TRIM
04F6  4F              LD    C,A           1;
04F7  FB       RUN125RA: EI
04F8  76              HALT
04F9
04F9  14       RUN125R2: INC D             1;DECREMENT INTEGRATOR (CAPSTAN FAST)
04FA  28 02           JR    Z,RUN125R3    1;
04FC  FB              EI                  1;
```

```
1252                              HALT
1253  04FD  76
1254                  ;
1255  04FE              RUN125R3:
1256  04FE  16 80                 LD      D,INTEGR         ;:DECREMENT TRIM REGISTER
1257  0500  0C                    INC     C                ;:RESET INTEGRATION REGISTER
1258  0501  16 80                 LD      D,080H           ;:
1259  0503  3E 7E                 LD      A,NULL+20H       ;:  (TEST LIMIT
1260  0505  B9                    CP      C                ;:  TEST LOWER TRIM LIMIT
1261  0506  30 01                 JR      NC,RUN125R4      ;:
1262  0508  4F                    LD      C,A              ;:
1263  0509  FB            RUN125R4: EI
1264  050A  76                    HALT
1265                  ;
1266                  ;;;;;;;;  EXIT RUN ROUTINE
1267                  ;
1268  050B  F3            EXIT125R: DI
1269  050C  79                    LD      A,C
1270  050D  D9                    EXX
1271  050E  4F                    LD      C,A
1272                  ;
1273  050F  3E 02                 LD      A,2
1274  0511  32 06 10              LD      (CONTROL),A
1275  0514  3A 05 10              LD      A,(COMMAND)
1276  0517  CB 5F                 BIT     HP,A             ;  test for HP card present
1277  0519  3E AC                 LD      A,NULL+MAXSTP    ;  SET MAXIMUM DECELERATE CURRENT
1278  051B  28 02                 JR      Z,NOHP1
1279  051D  C6 0A                 ADD     A,10             ;  increase for HP card
1280                  ;
1281  051F  32 04 10      NOHP1:  LD      (MOTOR),A
1282                  ;
1283  0522  16 01                 LD      D,1              ;  SET REVERSE STOP FLAG
1284  0524  C3 66 02              JP      STOP125
1286  0527
1287                  ;;;;;;;;;;;;;;;;;;;;;;;;;;;;;;;;;;;;;;;;;;;;
1288                  ;;                                        ;;
1289                  ;;                   REWIND               ;;
1290                  ;;                                        ;;
1291                  ;    NOTE: THIS ROUTINE USES REGISTER BANK-1
1292                  ;;;;;;;;;;;;;;;;;;;;;;;;;;;;;;;;;;;;;;;;;;;;
1293  0527
1294  0527
1295  0527
1296  0527  21 01 10      REWINDR: LD     HL,VELMSB        ;  INPUT VELOCITY MSB
1297  052A  7E                    LD      A,(HL)           ;  VERIFY
1298  052B  BE                    CP      (HL)
1299  052C  20 F9                 JR      NZ,REWINDR
1300  052E  E6 0F                 AND     MASK             ;  MASK SPEED SELECT BITS
1301  0530  28 07                 JR      Z,REWIND2
1302  0532  3E 3E                 LD      A,NULL-20H       ;  IF VELOCITY < 98 IPS MAINTAIN START CURRENT
1303  0534  32 04 10              LD      (MOTOR),A
1304  0537  18 EE                 JR      REWINDR
1305                  ;
1306  0539  21 07 10      REWIND2: LD     HL,REWIND        ;  LOAD REWIND SPEED COMMAND
1307  053C  7E                    LD      A,(HL)
```

```
1308  053D  BE                    CP    (HL)              VERIFY STABLE INPUT
1309  053E  20 F9                 JR    NZ,REWIND2
1310  0540  4F                    LD    C,A
1311  0541  21 02 10              LD    HL,VELOCITY
1312  0544  7E         REWIND3:   LD    A,(HL)            LOAD VELOCITY COUNT
1313  0545  BE                    CP    (HL)
1314  0546  20 FC                 JR    NZ,REWIND3        VERIFY
1315  0548  81                    ADD   A,C               ADD REWIND OFFSET
1316  0549  38 E7                 JR    C,REWIND1
1317  054B  D6 C4                 SUB   196
1318  054D  ED 44                 NEG
1319  054F  87                    ADD   A,A               MAINTAIN 1/4 MAX CURRENT IF TOO SLOW
1320  0550  C6 5E                 ADD   A,NULL
1321  0552  32 04 10              LD    (MOTOR),A         COMPUTE MOTOR CURRENT
1322
1323  0555  3A 05 10              LD    A,(COMMAND)
1324  0558  CB 7F                 BIT   GO,A              TEST FOR STOP COMMAND
1325  055A  20 04                 JR    NZ,REWINDX
1326  055C  CB 77                 BIT   FORWARD,A         TEST FOR FORWARD AND REWIND COMMANDS
1327  055E  20 C7                 JR    NZ,REWINDR
1328  0560  D9         REWINDX    EXX                     0:  switch back to bank-0
1329  0561  AF                    XOR   A                     set Z-flag
1330  0562  C3 19 05              JP    REVSTOP
1331
1332                  ;
1333                  ;******  EXIT REWIND ROUTINE
1334  0565
             ;**********************************************************
             ;*                                                        *
             ;*              SERVICE ROUTINES                          *
             ;*         -- uses register bank-0 --                     *
             ;*                                                        *
             ;**********************************************************
             ;*                                                        *
             ;* NULLSET:THIS ROUTINE WILL FIND AND STORE THE DIFFERENCE*
             ;* BETWEN THE CONVERTER TRUE AND NOMINAL NULLS,AND WILL   *
             ;* BLINK THE TEST LED IF THE TRUE NULL CAN NOT BE         *
             ;* DETERMINED                                             *
             ;* Bit's 3,4 of I-reg set to prevent interrupt MODE-1 vector
             ;* from conflicting with memory I/O ports                 *
             ;*                                                        *
             ;**********************************************************
             ;
             ;******  FIND D/A NULL
             ;
1357  0565  F3         NULLSET:   DI
1358  0566  3E 00                 LD    A,0
1359  0568  32 03 10              LD    (VELTEST),A
1360  056B  32 06 10              LD    (CONTROL),A       LED..on, NMI..disab, CAPSTAN park bit..rese
1361  056E  21 04 10              LD    HL,MOTOR
1362  0571  36 56                 LD    (HL),NULL-8       set d/a to voltage diff then null
```

```
1364  0573  2C                    INC   L
1365  0574  CB 46                 BIT   0,(HL)              ;error..if not positive
1366  0576  CA FA 05              JP    Z,LIGHTOFF
1367  0579  3E 56                 LD    A,NULL-8            ;SET MINIMUM ADJUST VALUE
1368  057B  3C                    INC   A
1369  057C  FE 66                 CP    102                 ;real_null < 94
1370  057E  28 7A                 JR    Z,LIGHTOFF          ;INC. VALUE EQUAL TO MAXIMUM VALUE?
1371  0580  2E 04                 LD    L,4                 ;ERROR exit
1372  0582  77                    LD    (HL),A              ;POINT TO MOTOR
1373  0583  2C                    INC   L                   ;NEW VALUE INTO MOTOR
1374  0584  00                    NOP                       ;POINT TO COMMAND REG
1375  0585  00                    NOP
1376        INCNULL:
1376  0586  CB 46                 BIT   0,(HL)
1377  0588  20 F1                 JR    NZ,INCNULL
1378  058A  3D                    DEC   A
1379  058B  47                    LD    B,A                 ;set B= real_null
1380  058C  FE 5E                 CP    NULL
1381  058E  30 0B                 JR    NC,NULLPOS          ;real_null >= nominal null
1382  0590  3E 5E                 LD    A,NULL
1383  0592  90                    SUB   B
1384  0593  E6 07                 AND   7
1385  0595  F6 18                 OR    18H                 ;real_null <94 ,NULL POLARITY=0
1386  0597  ED 47                 LD    I,A                 ;INITIALIZE TRIM OFFSET REGISTER
1387  0599  18 08                 JR    LAMPTEST
1388        ;
1389        NULLPOS:
1389  059B  D6 5E                 SUB   NULL
1390  059D  E6 07                 AND   7                   ;..only save 3-bits for null-offset
1391  059F  F6 98                 OR    98H                 ;real_null > 94 , NULL POLARITY=1
1392  05A1  ED 47                 LD    I,A                 ;NULL OFFSET INTO I REG.
1393        ;
1394        LAMPTEST:
1394  05A3  21 38 50              LD    HL,-45000           ;DELAY 250 MSEC
1395  05A6  11 02 00              LD    DE,2
1396  05A9  19        DELAY1:     ADD   HL,DE
1397  05AA  30 FD                 JR    NC,DELAY1
1398        ;;
1399  05AC  3E 02                 LD    A,LEDNMIOF          ;TURN OFF TEST LED; NMI DISABLED;PARKED BIT
1400  05AE  32 06 10              LD    (CONTROL),A
1401        ;;
1402  05B1  21 38 50              LD    HL,-45000
1403  05B4  11 01 00              LD    DE,1
1404  05B7  19        DELAY2:     ADD   HL,DE
1405  05B8  30 FD                 JR    NC,DELAY2
1406        ;;
1407        ;;;;;;;;; WAIT FOR FIRST TACH LINE  (INITIALIZE VELOCITY COUNTER)
1408        ;;
1409        FIRSTTAC:
1410  05BA  3E 00                 LD    A,0                 ;DISABLE NMI,TURN LED ON RES CAPS,PARKED
1411  05BC  32 06 10              LD    (CONTROL),A
1412        ;;
1413  05BF  3A 01 10              LD    A,(VELMSB)
1414  05C2  E6 0F                 AND   MASK
1415  05C4  5F                    LD    E,A
1416        ;;
1417  05C5  3E 72                 LD    A,NULL+20           ;SET CURRENT TO OBTAIN FIRST TACH LINE
```

```
                    LD    (MOTOR),A        WAIT FOR EPO RELAY TO CLOSE 1418
1419  05C7  32 04 10
1420  05CA  3A 01 10   FT1:  LD    A,(VELMSB)
1421  05CD  E6 0F            AND   MASK
1422  05CF  BB               CP    E
1423  05D0  CA CA 05         JP    Z,FT1
1424
1425  05D3  78               LD    A,B              load (real_null) to motor
1426  05D4  32 04 10         LD    (MOTOR),A
1427                                                set forward and reverse RUN current's
1428  05D7  48               LD    C,B              reverse
1429
1430  05D8  21 01 10         LD    HL,VELMSB        LOAD VELOCITY MSB INPUT
1431  05DB  7E               LD    A,(HL)
1432  05DC  E6 E0            AND   0E0H             only look at speed select bits
1433  05DE  FE C0            CP    0C0H             TEST 125IPS SELECT
1434  05E0  C2 FA 05         JP    NZ,LIGHTOFF      NO wrong speed setting...>>> ABORT <<<
1435  05E3  3E 03            LD    A,NOLEDNMI       ENABLE NMI,TURN LED OFF,RES.CAPS.PARKED
1436  05E5  32 06 10         LD    (CONTROL),A
1437
1438  05E8  DD 21 03 00      LD    IX,START         0; Interrupts not enabeled yet..but just in
1439  05EC  31 00 40         LD    SP,SSTACK        0; defalt value
1440  05EF  26 00            LD    H,00             0; SET BIT 7 LOW (REGISTER BANK 0)
1441  05F1  D9               EXX                    1; SELECT REGISTER BANK 1
1442  05F2  26 80            LD    H,80H            1; SET BIT 7 HIGH (REGISTER BANK 1)
1443  05F4  D9               EXX                    0; SELECT REGISTER BANK 0
1444  05F5  ED 56            IM    1                0; SELECT INTERRUPT MODE 1
1445  05F7  C3 4F 00         JP    IDLE             0;
1446
1447
1448  05FA  3E 02    LIGHTOFF: LD   A,LEDNMIOF       DISABLE NMI,TURN LED OFF RES.CAPS.PARKED
1449  05FC  32 06 10         LD    (CONTROL),A
1450  05FF  06 03            LD    B,3
1451  0601  21 48 77 OFFDLY: LD   HL,-35000         275 MSEC DELAY
1452  0604  11 02 00         LD    DE,2
1453  0607  19       OFFDLY1: ADD  HL,DE
1454  0608  D2 07 08         JP    NC,OFFDLY1
1455  060B  10 F4            DJNZ  OFFDLY
1456  060D  3E 00            LD    A,0              TURN LED ON,DISABLE NMI,RES.CAPS.PARKED
1457  060F  32 06 10         LD    (CONTROL),A
1458  0612  06 03            LD    B,3
1459  0614  21 48 77 ONDLY:  LD    HL,-35000        775 MSEC. DELAY
1460  0617  11 01 00         LD    DE,1
1461  061A  19       ONDLY1: ADD   HL,DE
1462  061B  D2 1A 06         JP    NC,ONDLY1
1463  061E  10 F4            DJNZ  ONDLY
1464  0620  C3 03 00         JP    START
1465
1468  0623
1469  0623
```

LOOK-UP TABLES

```
                    VELOCITY CONTROLLED RAMP    FOR COUNT OF 192: OFFSET = 192/2 = 96 = X'
                    ORG    760H
                                         VELOCITY    VELOCITY
                              CURRENT    COUNT       (IPS)
TABLE1              DB        0          192
                    DB        2          194
                    DB        3          196
                    DB        5          198
                    DB        6          200
                    DB        8          202
                    DB        9          204
                    DB        11         206
                    DB        12         208
                    DB        14         210
                    DB        15         212
                    DB        17         214
                    DB        18         216
                    DB        20         218
                    DB        21         220
                    DB        22         222
                    DB        24         224
                    DB        25         226
                    DB        27         228
                    DB        28         230
                    DB        30         232
                    DB        31         234
                    DB        33         236
                    DB        34         238
                    DB        36         240
                    DB        37         242
                    DB        39         244
                    DB        40         246
                    DB        42         248
                    DB        43         250
                    DB        45         252
                    DB        46         254
                    DB        47         256

VELOCITY CONTROLLED RAMP    -- COUNT > 256
                                         VELOCITY    VELOCITY
                              CURRENT    COUNT       (IPS)
TABLE3              DB        48         100H
                    DB        51         108
```

| | | | | | | |
|---|---|---|---|---|---|---|
| 1524 | 0783 | 36 | DB | 54 | DB | 110 |
| 1525 | 0784 | 39 | DB | 57 | DB | 118 |
| 1526 | 0785 | 3C | DB | 60 | DB | 120 |
| 1527 | 0786 | 3F | DB | 63 | DB | 128 |
| 1528 | 0787 | 42 | DB | 66 | DB | 130 |
| 1529 | 0788 | 45 | DB | 69 | DB | 138 |
| 1530 | 0789 | 48 | DB | 72 | DB | 140 |
| 1531 | 078A | 4B | DB | 75 | DB | 148 |
| 1532 | 078B | 4E | DB | 78 | DB | 150 |
| 1533 | 078C | 51 | DB | 81 | DB | 158 |
| 1534 | 078D | 51 | DB | 81 | DB | 160 |
| 1535 | 078E | 51 | DB | 81 | DB | 168 |
| 1536 | 078F | 51 | DB | 81 | DB | 170 |
| 1537 | 0790 | 51 | DB | 81 | DB | 178 |
| 1538 | 0791 | 51 | DB | 81 | DB | 180 |
| 1539 | 0792 | 51 | DB | 81 | DB | 188 |
| 1540 | 0793 | 51 | DB | 81 | DB | 190 |
| 1541 | 0794 | 51 | DB | 81 | DB | 198 |
| 1542 | 0795 | 51 | DB | 81 | DB | 1A0 |
| 1543 | 0796 | 51 | DB | 81 | DB | 1A8 |
| 1544 | 0797 | 51 | DB | 81 | DB | 1B0 |
| 1545 | 0798 | 52 | DB | 82 | DB | 1B8 |
| 1546 | 0799 | 52 | DB | 82 | DB | 1C0 |
| 1547 | 079A | 52 | DB | 82 | DB | 1C8 |
| 1548 | 079B | 52 | DB | 82 | DB | 1D0 |
| 1549 | 079C | 52 | DB | 82 | DB | 1D8 |
| 1550 | 079D | 52 | DB | 82 | DB | 1E0 |
| 1551 | 079E | 52 | DB | 82 | DB | 1E8 |
| 1552 | 079F | 52 | DB | 82 | DB | 1F0 |
| 1553 | 07A0 | 52 | DB | 82 | DB | 1F8 |
| 1554 | 07A1 | 52 | DB | 82 | | |

;********
;-------- ACCELERATION CURRENT FOR SHORT GO-DOWN
TABLE2

| | | | | CURRENT MAX = 85 | VELOCITY COUNT/32 | VELOCITY (IPS) |
|---|---|---|---|---|---|---|
| 1555 | 07A1 | 00 | DB | 0 | 0 | — |
| 1556 | 07A2 | 00 | DB | 0 | 1 | 768 |
| 1557 | 07A3 | 00 | DB | 0 | 2 | 368 |
| 1558 | 07A4 | 00 | DB | 0 | 3 | 258 |
| 1559 | 07A5 | 00 | DB | 0 | 4 | 189 |
| 1560 | 07A6 | 00 | DB | 0 | 5 | 153 |
| 1561 | 07A7 | 00 | DB | 0 | 6 | 127 |
| 1562 | 07A8 | 28 | DB | 40 | 7 | 110 |
| 1563 | 07A9 | 2C | DB | 44 | 8 | 96 |
| 1564 | 07AA | 30 | DB | 48 | 9 | 85 |
| 1565 | 07AB | 34 | DB | 52 | 10 | 77 |
| 1566 | 07AC | 38 | DB | 56 | 11 | 70 |
| 1567 | 07AD | 3C | DB | 60 | 12 | 64 |
| 1568 | 07AE | 40 | DB | 64 | 13 | 59 |
| 1569 | 07AF | 44 | DB | 68 | 14 | 55 |
| 1575 | 07B0 | 48 | DB | 72 | 15 | 51 |
| 1576 | 07B1 | 4E | DB | 78 | 16 | 48 |
| 1577 | 07B2 | 52 | DB | 82 | 17 | 45 |

```
1578 0783 52                              DB      82      ;  43
1579 0784 52                              DB      82      ;  40
1580 0785
1581 0785
1582 0785
1583 0785        ;********** STOP PULSE CURRENT TABLE **********
1584                                                             VELOCITY   VELOCITY
1585                                              CURRENT        COUNT/128   (IPS)
1586
1587 0785 10     PULSETBL: DB    16      ;    0        189
1588 0786 0F              DB    15      ;    1         96
1589 0787 0E              DB    14      ;    2         64
1590 0788 0D              DB    13      ;    3         48
1591 0789 0C              DB    12      ;    4         39
1592 078A 0B              DB    11      ;    5         32
1593 078B 0A              DB    10      ;    6         28
1594 078C 09              DB     9      ;    7         24
1595 078D 08              DB     8      ;    8         22
1596 078E 07              DB     7      ;    9         19
1597 078F 06              DB     6      ;   10         19
1598 07C0 05              DB     5      ;   11         18
1599 07C1 04              DB     4      ;   12         18
1600 07C2 03              DB     3      ;   13         15
1601 07C3 03              DB     3      ;   14         14
1602 07C4 03              DB     3      ;   15         13
1603 07C5 03
1604 07C5
1605 07C5
1606 07C5        ;********** STOPLOCK TABLE **********
1607 07C5
1608 07C5        ;:
1609 07C5 00 00 08 08 08 08 08 0A
1610           STLCKTBL: DB     0,0,8,8,8,8,8,10
1611 07CD 0C 0C 10 10
1612 07D1 0E 10 10                       DB    10,12,12,14,14,16,16,16
1613 07D5 12 12 14 14 16 16
1614 07D9                                DB    18,18,18,20,20,20,22,22
1615 07DD
1616 07DD
1617 07E0                     ORG    7E0H
1618 07E0 56                   VERSION:  DB    'V'
1619 07E1 56                             DB    65H,72H ;"ER"
1620 07E3 72                             DB    ' A02 '
1621 07E4 20 41 30 32
1622 07E8 20
1623 07E9 65 72
1624 07EB 20 41 30 32
1625 07EF 20
1626 07F0 31 32 2D 4A                    DB    '12-JUN81'
1627 07F4 55 4E 38 31
1628 07F8
1629 07F8                     END
1630 07F8
```

CROSS REFERENCE

| LABEL | VALUE | REFERENCE | | | | | | |
|---|---|---|---|---|---|---|---|---|
| A0 | 0000 | -241 | | | | | | |
| A30 | 0030 | -267 | | | | | | |
| ACC125 | 00F3 | 340 | 420 | -434 | | | | |
| ACC125A | 0100 | -442 | 445 | | | | | |
| ACC125B | 0118 | 446 | -461 | | | | | |
| ACC125C | 0124 | -461 | -467 | | | | | |
| ACC125D | 0140 | 475 | -479 | 484 | | | | |
| ACC125E | 0142 | 470 | -482 | | | | | |
| ACC125F | 014D | -487 | 488 | | | | | |
| ACC125G | 0151 | 486 | -491 | | | | | |
| ACC125H | 015E | -498 | 505 | | | | | |
| ACC125J | 016D | 472 | -509 | | | | | |
| ACC125N | 00FC | -439 | | | | | | |
| ACC125R | 010A | 436 | -450 | | | | | |
| ACC125S | 0110 | -454 | 457 | | | | | |
| ACC125T | 0437 | 494 | -1098 | 1105 | | | | |
| ACCHIS | 0154 | -493 | | | | | | |
| BANK | 0007 | -208 | 325 | 928 | 789 | 836 | 882 | 509 561 |
| CMD | 0005 | -98 | 361 | 740 | 434 | 473 | 491 | 1275 1323 |
| COMMAND | 1005 | -136 | 304 | 411 | 1045 | 1061 | 1140 | |
| CONT | 0006 | 682 | 921 | 1007 | | | | |
| CONTROL | 1006 | -99 | 835 | | | | | |
| CRTBUF | 4200 | -149 | 251 | 303 | 323 | 881 | 926 | 1274 1361 |
| DELAY1 | 05A9 | 1400 | 1411 | 1436 | 1449 | 1457 | | |
| DELAY2 | 05B7 | 1397 | 1405 | | | | | |
| ERROR | 0248 | -1404 | -695 | 1188 | | | | |
| EXIT125F | 022E | 615 | -674 | | | | | |
| EXIT125R | 050B | 628 | -1268 | | | | | |
| EXITGO | 0263 | 1208 | -729 | | | | | |
| EXITGOF | 0257 | 724 | 586 | -721 | | | | |
| EXITGOF1 | 025B | 563 | 496 | -722 | | | | |
| EXITGOR | 025E | 477 | 1142 | 1166 | | | | |
| EXITGOR1 | 025F | -726 | -727 | | | | | |
| FIRSTTAC | 058A | 478 | | | | | | |
| FORWARD | 0006 | -1410 | | | | | | |
| FT1 | 05CA | -144 | 362 | 419 | 435 | 476 | 493 | 510 882 |
| GO | 0007 | 1008 | 1046 | 1326 | 495 | 562 | 585 | 740 789 |
| GOINT | 0068 | -1420 | 1423 | | 1324 | | | |
| GOINT1 | 0071 | -145 | 305 | 474 | 398 | 898 | 1063 | |
| GOINT2 | 0079 | 1062 | 1141 | 1165 | | | | |
| GOINT2A | 0076 | 308 | -322 | 355 | | | | |
| GOINT3 | 008A | 326 | -329 | | | | | |
| GOINT5 | 00C9 | -334 | 336 | | | | | |
| GOINT6 | 00DE | -346 | 349 | 390 | | | | |
| HP | 0003 | 343 | -387 | | | | | |
| IBGCNTR | 0002 | 370 | -403 | 1276 | | | | |
| | | -141 | 683 | | | | | |
| | | -140 | 836 | | | | | |

| Symbol | Addr | Val1 | Val2 | Val3 | Val4 | Val5 | Val6 | Val7 | Val8 | Val9 |
|---|---|---|---|---|---|---|---|---|---|---|
| IDLE | 004F | -301 | | | | | | | | |
| IDLE1 | 0054 | -304 | 923 | | | | | | | |
| INCNULL | 0578 | -1368 | 309 | | | | | | | |
| INTEGR | 0080 | -215 | 1377 | 647 | 1445 | | | | | |
| LAMPTEST | 05A3 | 1387 | 593 | 1399 | | 662 | 1172 | 1239 | 1255 | 766 |
| LEDNM1OF | 0002 | -209 | -1394 | 1434 | 1448 | 488 | 543 | 697 | 535 | |
| LIGHTOFF | 05FA | 1366 | 322 | 353 | -1448 | 1421 | 1005 | 1041 | 918 | |
| MASK | 000F | -207 | 1370 | 1300 | 394 | 1414 | 1277 | 1043 | 1128 | 1281 |
| | | 866 | 337 | 363 | 1003 | | | | 1258 | |
| MAX | 0055 | -206 | 1135 | 722 | 727 | | | | | |
| MAXSTP | 004E | -205 | 338 | | | | | | | |
| MEMORY | 0000 = | | 684 | | | | | | | |
| MOTOR | 1004 | 0 | | | | | | | | |
| MOTR | 0004 | -131 | 299 | 376 | 443 | 455 | 501 | 524 | 453 | |
| NARG | 0000 | 557 | 688 | 729 | 757 | 804 | 813 | 892 | 805 | |
| NM1ENBL | 0000 | 953 | 1013 | 1051 | 1083 | 1101 | 1118 | 1128 | 1258 | |
| NOHP | 0244 | 1303 | 1321 | 1362 | 1418 | 1426 | 1380 | 1382 | 1389 | |
| NOHP1 | 051F | -97 | 833 | | | | | | | |
| NOLEDNM1 | 0003 | -151 | | 1435 | | | | | | |
| NOSTOP | 0084 | 685 | -687 | | | | | | | |
| NULL | 005E | 1278 | -1280 | 297 | 363 | 438 | 441 | 450 | | |
| | | -210 | 835 | 727 | 748 | 755 | 758 | 802 | | |
| | | 367 | -373 | 833 | 891 | 914 | 917 | 1242 | | |
| | | -203 | 294 | 1320 | 1363 | 1367 | 1380 | 1382 | | |
| NULLMIN | 0056 | 684 | 722 | | | | | | | |
| NULLPOL | 0007 | 811 | 814 | 910 | | | | | | |
| NULLPOS | 059B | 1277 | 1302 | | | | | | | |
| NULLSET | 0565 | 1417 | | | | | | | | |
| OFFDLY | 0601 | -204 | 290 | | | | | | | |
| OFFDLY1 | 0607 | -211 | -1389 | | | | | | | |
| ONDLY | 0614 | 1381 | -1357 | | | | | | | |
| ONDLY1 | 061A | 253 | 1455 | | | | | | | |
| PARKED | 0002 | -1451 | 1454 | | | | | | | |
| PASTSTP1 | 03EB | -1453 | 1463 | | | | | | | |
| PASTSTPH | 03D8 | -1459 | 1462 | | | | | | | |
| POLARITY | 0000 | -1461 | -1030 | 1376 | | | | | | |
| POSITION | 1000 | -153 | -1019 | 950 | 955 | 956 | 970 | 971 | 1068 | |
| POSIN | 0000 | 1024 | 1365 | 843 | | | | | | |
| | | 975 | 734 | | | | | | | |
| | | -138 | 842 | | | | | | | |
| | | -106 | | | | | | | | |
| | | -93 | | | | | | | | |
| | | 1069 | | | | | | | | |
| PREID | 0048 | 291 | -298 | 1065 | | | | | | |
| PREIDL | 004C | 295 | -298 | | | | | | | |
| PREIDLE | 003A | -289 | 837 | | | | | | | |
| PSISTP1A | 03E2 | -1025 | 876 | 879 | -1587 | | | | | |
| PULSETBL | 07B5 | 874 | | | | | | | | |
| PWRSAFE | 0001 | -139 | -796 | 808 | | | | | | |
| RAMP | 02C5 | 790 | -802 | -811 | | | | | | |
| RAMP0. | 02C9 | 753 | -803 | | | | | | | |
| RAMP00 | 02CB | 749 | 797 | | | | | | | |
| RAMP1 | 02D8 | 744 | | | | | | | | |
| RAMP11 | 02DA | -812 | 815 | | | | | | | |
| RAMP2 | 02BC | -756 | 759 | | | | | | | |

| Label | Hex | Col1 | Col2 | Col3 | Col4 | Col5 | Col6 |
|---|---|---|---|---|---|---|---|
| READY | 0005 | −143 | | | | | |
| REVSTOP | 0519 | −1277 | 307 | | | | |
| REW | 0007 | −100 | 1330 | | | | |
| REWIND | 1007 | −157 | 1228 | | | | |
| REWIND1 | 0532 | −1302 | 1318 | 1308 | | | |
| REWIND2 | 0539 | 1301 | −1306 | 1309 | | | |
| REWIND3 | 0544 | −1312 | 1314 | | | | |
| REWINDR | 0527 | 1234 | −1296 | 1299 | 1304 | | |
| REWINDX | 0560 | 1325 | −1328 | | 1327 | | |
| RUN125F | 01F1 | 598 | −608 | | | | |
| RUN125F0 | 0211 | 637 | −641 | | | | |
| RUN125F1 | 0213 | 640 | −646 | | | | |
| RUN125F2 | 021E | 636 | −656 | | | | |
| RUN125F3 | 0223 | 657 | −661 | | | | |
| RUN125F4 | 022C | 666 | −668 | | | | |
| RUN125FA | 021C | 651 | −653 | | | | |
| RUN125R | 04AC | 1175 | −1186 | | | | |
| RUN125R0 | 04D9 | 1221 | −1225 | 1230 | 1232 | | |
| RUN125R1 | 04EC | 1224 | −1238 | | | | |
| RUN125R2 | 04F9 | 1220 | −1249 | | | | |
| RUN125R3 | 04FE | 1250 | −1254 | | | | |
| RUN125R4 | 0509 | 1260 | −1262 | | | | |
| RUN125RA | 04F7 | 1244 | −1246 | | | | |
| RUN125RC | 04DB | 1216 | −1228 | | | | |
| RWND | 0004 | −142 | | | | | |
| SEL125 | 0005 | −114 | | | | | |
| SEL50 | 0007 | −116 | | | | | |
| SEL75 | 0006 | −115 | | | | | |
| SHOWA | 0BBF | −163 | | | | | |
| SHOWBC | 0877 | −162 | | | | | |
| SHOWDE | 0842 | −161 | | | | | |
| SPLK0A | 0356 | 911 | 263 | | | | |
| SPLK1H | 0391 | 959 | 259 | | | | |
| SPLK1H1 | 0381 | 985 | 256 | | | | |
| SPLK1H1A | 03AB | −986 | −916 | 972 | | | |
| SPLK3H | 0383 | 981 | −969 | | | | |
| SPLK3H1 | 03BB | −998 | −991 | | | | |
| SPLK3H1A | 03BB | 992 | −994 | | | | |
| SPLK4H | 03C1 | 997 | | | | | |
| SPLK5H | 03C7 | −1006 | −1003 | | | | |
| SPLK6H | 03D2 | 1004 | −1008 | | | | |
| SPLK7H | 03EA | 1010 | −1012 | | | | |
| SPLK7H1A | 03F0 | 1021 | −1033 | | | | |
| SPLK8H | 03F6 | 1036 | 1035 | −1041 | | | |
| SPLK9H | 03FC | 1031 | −1044 | | | | |
| SPLKAH | 0407 | 1042 | −1050 | | | | |
| SPLKAH1 | 0408 | 1048 | −1056 | | | | |
| SPLKTIME | 040D | 1014 | 1077 | 985 | | | |
| SPLKTM1 | 037F | −1058 | 957 | 559 | 588 | 628 | 1138 1167 1210 |
| SPOS2 | 041D | −954 | 1070 | | | | |
| SPOS4 | 4000 | −1067 | 462 | | | | |
| SSTACK | | −214 | −518 | | | | |
| | | 1439 | | | | | |
| ST125F | 0175 | 506 | −542 | | | | |
| ST125F1 | 0197 | 529 | −558 | | | | |
| ST125F1A | 01B4 | 547 | | | | | |

| Label | Addr | | | | | | | | |
|---|---|---|---|---|---|---|---|---|---|
| ST125F2 | 01C6 | 545 | | | | | | | |
| ST125F3 | 01E5 | 380 | -568 | | | | | | |
| ST125FA | 018E | -533 | 571 | | | | | | |
| ST125R | 0444 | 364 | 537 | | | | | | |
| ST125R1 | 0466 | 1123 | 511 | | | | | | |
| ST125R2 | 047E | 1137 | -1134 | | | | | | |
| ST125R3 | 04A0 | 1154 | -1147 | | | | | | |
| ST125RZ | 045D | -1126 | -1172 | -593 | | | | | |
| STACK | 0000 | 0 | 1130 | -1110 | | | | | |
| START | 0003 | -250 | 359 | 899 | 1438 | 1464 | | | |
| STLCKTBL | 07C5 | 987 | 999 | 1028 | 1037 | -1611 | | | |
| STMDEAD | 0428 | 1059 | -1081 | | | | | | |
| STOP125 | 0266 | 691 | -733 | 1284 | | | | | |
| STOP125A | 026C | -736 | 767 | | | | | | |
| STOP125B | 0297 | 741 | -762 | 765 | | | | | |
| STOP125C | 02AC | -779 | 781 | | | | | | |
| STOP125E | 02BA | 785 | -788 | 794 | | | | | |
| STOP125F | 02E3 | 760 | 769 | 809 | -832 | | | | |
| STOP125H | 02F6 | -841 | 844 | 854 | | | | | |
| STOP125L | 0309 | -860 | 865 | | | | | | |
| STOP125M | 032C | 877 | -881 | | | | | | |
| STOP125N | 033C | 884 | -890 | | | | | | |
| STOP125P | 0345 | -895 | 896 | | | | | | |
| STOPDIR | 0000 | -213 | 743 | 798 | 982 | 994 | 1022 | | |
| STOPDIST | 007D | -212 | 958 | 973 | | | | | |
| STOPLI | 0314 | -868 | 870 | 1087 | | -908 | | | |
| STOPLCK | 0374 | -949 | 974 | 850 | | | | | |
| STOPLOCK | 0348 | 308 | 847 | | | | | | |
| STP1 | 0370 | 929 | -933 | | | | | | |
| STPLOCK | 035A | 915 | -918 | | | | | | |
| TABLE1 | 0760 | 1121 | -1482 | | -1560 | | | | |
| TABLE2 | 07A1 | 378 | 406 | 409 | 393 | 467 | 696 | 1122 | 1296 |
| TABLE3 | 0781 | 527 | 553 | -1522 | 387 | 463 | 482 | 530 | 560 |
| TESTLED | 0001 | -152 | | | | | | | |
| VELINT | 0038 | -280 | | | | | | | |
| VELMSB | 1001 | -112 | 333 | 352 | | | 869 | | |
| VELOCITY | 1002 | 1413 | 1420 | 1430 | 780 | 868 | | | |
| VELTEST | 1003 | -120 | 346 | 381 | 863 | 864 | | | |
| VERSION | 07E0 | 1124 | 1139 | 1311 | | | | | |
| VLSB | 0002 | -126 | 330 | 1360 | | | | | |
| VMSB | 0001 | -1620 | 737 | 779 | | | | | |
| VSEQ | 0003 | -95 | 763 | 764 | | | | | |
| XDELAY | 0431 | -94 | 739 | 778 | | | | | |
| | | -98 | 1086 | | | | | | |
| | | -1085 | | | | | | | |

I claim:

1. A magnetic tape drive comprising:
   first and second reels for the supply and take-up of tape;
   a read/write head;
   a capstan for moving said tape with respect to said read/write head;
   a motor driving said capstan;
   means for outputting feedback signals indicative of the actual velocity of the motor; and
   means for control of said motor, said means for control of said motor comprising:
   a microprocessor adapted to receive GO and STOP commands for control of said motor in addition to said feedback signals indicative of the actual velocity of said motor, and to generate responsive signals for control of said motor based on said feedback signals and said commands, said microprocessor examining its previous history upon receipt of a given GO or STOP command so as to determine which of a plurality of possible predetermined control signal sequences, each causing differing maximum rates of change of motor velocity shall be generated in response to said given GO or STOP command, whereby excitation of mechanical resonances in said system can be avoided.

2. The drive of claim 1 wherein said means for outputting feedback signals further comprises velocity and position decoder means for supplying said microprocessor with digital information relating to the position and velocity of said capstan at a given time.

3. The system of claim 2 wherein said digital output signals provided by said microprocessor are converted in digital-to-analog converter means to an analog signal used to control the motor driving said capstan.

4. The system of claim 1 wherein said microprocessor accesses read-only memory means for determination of proper output signal to be given upon receipt of given input commands.

5. In a magnetic tape drive of the type comprising a capstan and capstan motor for accelerating tape in the vicinity of a read/write head, and comprising microprocessor means for control of the motion of said capstan, the improvement which comprises:
   said microprocessor comprising means for storing previously received commands and for examining the last previous command upon receipt of a newly input GO or STOP command, and for determining the maximal rate of change of motor current which will avoid excitation of mechanical resonance in said system, and to output one of a plurality of predetermined sequences of control signals to said motor in response to said means for determining.

6. The system of claim 5 wherein velocity profiles corresponding to said predetermined possible courses of action are stored in read-only memory and said microprocessor accesses said read-only memory upon receipt of said input commands.

7. A magnetic tape drive comprising:
   spindle and motor means for receiving first and second reels of tape and for rotation of the same;
   a capstan for controlling the motion of the tape between said reels;
   a capstan motor;
   a read/write head for reading and writing data to and from said tape; and
   control means for controlling the capstan motor, said control means comprising:
   means for responding to GO and STOP commands;
   means for supplying current to said capstan motor for control thereof;
   means for storing signals representative of the present status of the tape drive; and
   microprocessor means for generating a sequence of control signals for controlling said means for supplying current in response to one of said GO or STOP commands and in response to the present status of said tape drive, such that differing sequences of control signals are generated by said microprocessor in response to identical GO or STOP commands in dependence on the present status of said tape drive, and such that the maximum current supplied to said motor varies responsive to said differing sequences.

8. The system of claim 7 wherein said sequences of control signals are stored and are selected by said microprocessor responsive to said signal representing the present status of the drive.

* * * * *